(12) United States Patent
Hartson et al.

(10) Patent No.: US 8,667,539 B2
(45) Date of Patent: Mar. 4, 2014

(54) SYSTEM FOR SCANABLE ICON DETECTION AND MANAGEMENT

(75) Inventors: Ted Elliott Hartson, Scottsdale, AZ (US); Elijah Ethan Brown, Prescott Valley, AZ (US); Walter Stanley Ciciora, Southport, CT (US)

(73) Assignee: Symbol Shifters, LLC, Prescott Valley, AZ (US)

( * ) Notice: Subject to any disclaimer, the term of this patent is extended or adjusted under 35 U.S.C. 154(b) by 0 days.

(21) Appl. No.: 13/555,757

(22) Filed: Jul. 23, 2012

(65) Prior Publication Data

US 2013/0188095 A1 Jul. 25, 2013

Related U.S. Application Data

(60) Provisional application No. 61/574,459, filed on Aug. 3, 2011, provisional application No. 61/627,619, filed on Oct. 14, 2011, provisional application No. 61/690,097, filed on Jun. 19, 2012, provisional application No. 61/690,104, filed on Jun. 19, 2012.

(51) Int. Cl.
| | |
|---|---|
| *H04H 60/32* | (2008.01) |
| *G06F 3/00* | (2006.01) |
| *G06F 13/00* | (2006.01) |
| *H04N 5/445* | (2011.01) |

(52) U.S. Cl.
USPC ............................................. 725/51; 725/19

(58) Field of Classification Search
None
See application file for complete search history.

(56) References Cited

U.S. PATENT DOCUMENTS

| | | | | |
|---|---|---|---|---|
| 7,305,691 | B2 * | 12/2007 | Cristofalo | 725/34 |
| 7,590,941 | B2 | 9/2009 | Wee et al. | |
| 7,623,823 | B2 | 11/2009 | Zito et al. | |
| 7,757,248 | B2 * | 7/2010 | Harkness et al. | 725/22 |
| 7,992,175 | B2 * | 8/2011 | Kahn et al. | 725/68 |
| 8,055,901 | B2 * | 11/2011 | Behm et al. | 713/176 |
| 8,102,544 | B2 * | 1/2012 | Yoshimura et al. | 358/1.11 |
| 8,326,212 | B2 * | 12/2012 | Ramaswamy et al. | 455/2.01 |
| 8,386,339 | B2 * | 2/2013 | Minnick et al. | 705/26.81 |
| 8,430,302 | B2 | 4/2013 | Minnick et al. | |
| 8,433,800 | B2 * | 4/2013 | Chor | 709/225 |
| 8,443,407 | B2 * | 5/2013 | Gaede et al. | 725/88 |
| 8,484,087 | B2 * | 7/2013 | Harper et al. | 705/26.7 |

(Continued)

OTHER PUBLICATIONS http://zbar.sourceforge.net/index.html, Admitted Prior Art.

(Continued)

*Primary Examiner* — Brian Pendleton
*Assistant Examiner* — Jonathan V Lewis
(74) *Attorney, Agent, or Firm* — Kilpatrick Townsend & Stockton LLP

(57) ABSTRACT

This invention enables Scanable Icons, which may be predetermined graphical images, and similar encoded information to be applied to video systems in a manner that is user-friendly and brings many of the advantages of easy information access and management to the video environment. The optical path normally required when using such encoded information is avoided. Supplementary information, including more details for advertisements, is provided in a non-invasive manner, allowing the user to access the supplementary information at convenient times and locations. The Scanable Icon adds a symbol to the existing advertisement without increasing its duration. Advertising is made substantially more effective for the advertiser and more useful for the consumer.

22 Claims, 18 Drawing Sheets

(56) References Cited

U.S. PATENT DOCUMENTS

| | | | |
|---|---|---|---|
| 2002/0010941 | A1 | 1/2002 | Johnson |
| 2002/0023263 | A1* | 2/2002 | Ahn et al. ............... 725/32 |
| 2003/0115612 | A1* | 6/2003 | Mao et al. ............... 725/136 |
| 2005/0071868 | A1 | 3/2005 | Yoshida |
| 2005/0198661 | A1 | 9/2005 | Collins et al. |
| 2005/0198672 | A1* | 9/2005 | Ikeda ............... 725/62 |
| 2006/0036585 | A1 | 2/2006 | King et al. |
| 2006/0265731 | A1* | 11/2006 | Matsuda ............... 725/131 |
| 2007/0006275 | A1 | 1/2007 | Wright et al. |
| 2007/0016936 | A1* | 1/2007 | Okada et al. ............... 725/136 |
| 2009/0217335 | A1 | 8/2009 | Wong et al. |
| 2010/0325657 | A1* | 12/2010 | Sellers et al. ............... 725/32 |
| 2012/0067943 | A1* | 3/2012 | Saunders et al. ............... 235/375 |
| 2012/0137318 | A1 | 5/2012 | Kilaru et al. |
| 2012/0272279 | A1* | 10/2012 | Lim et al. ............... 725/109 |
| 2012/0311623 | A1 | 12/2012 | Davis et al. |
| 2013/0024882 | A1* | 1/2013 | Lee et al. ............... 725/23 |
| 2013/0036434 | A1 | 2/2013 | Shkedi et al. |
| 2013/0104180 | A1 | 4/2013 | Knightbridge |

OTHER PUBLICATIONS http://zbar.sourceforge.net/about.html, Admitted Prior Art.

Non-Final Office Action, U.S. Appl. No. 13/650,425, mailed May 17, 2013.

Final Office Action, U.S. Appl. No. 13/650,425, mailed Aug. 27, 2013.

* cited by examiner

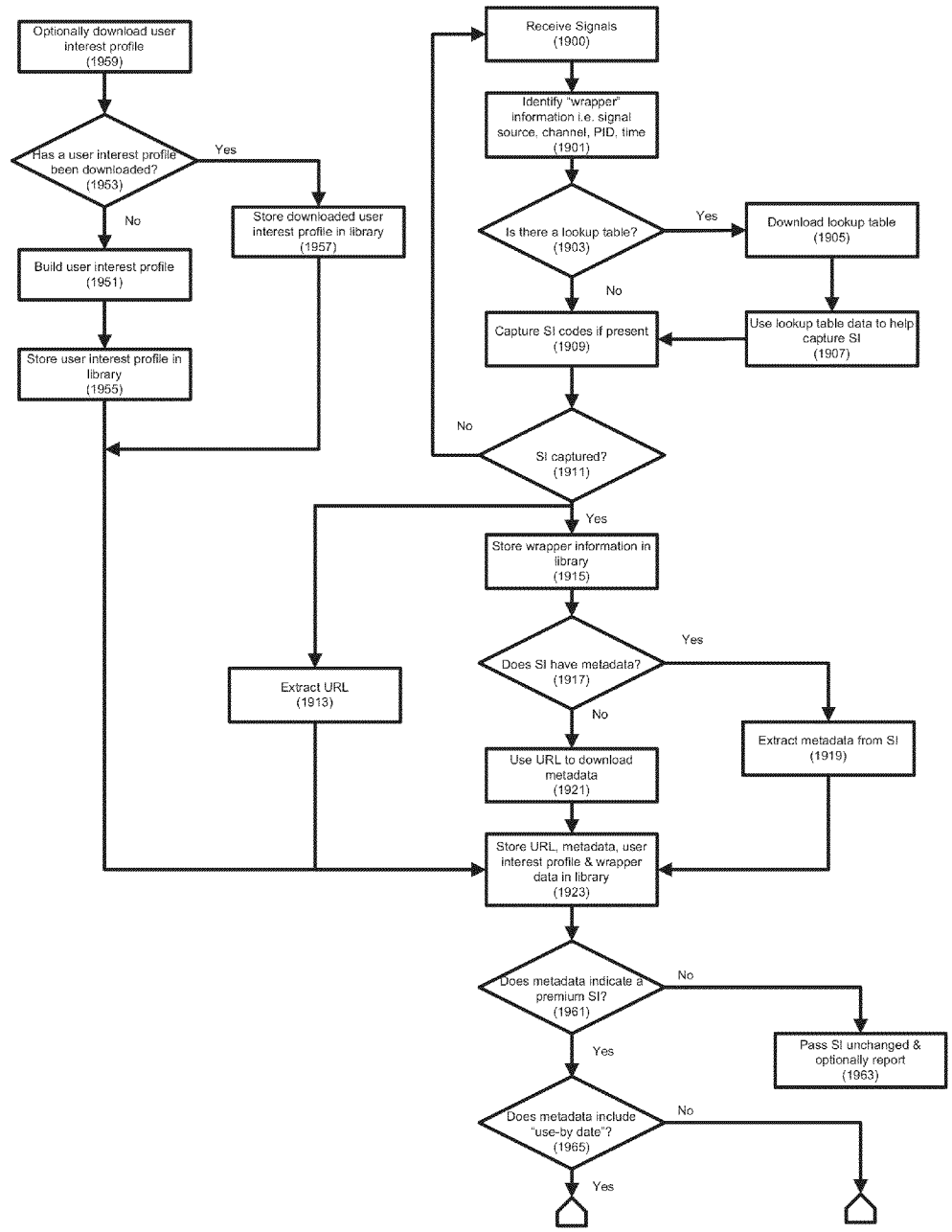
*Fig. 19 (Part 1)*

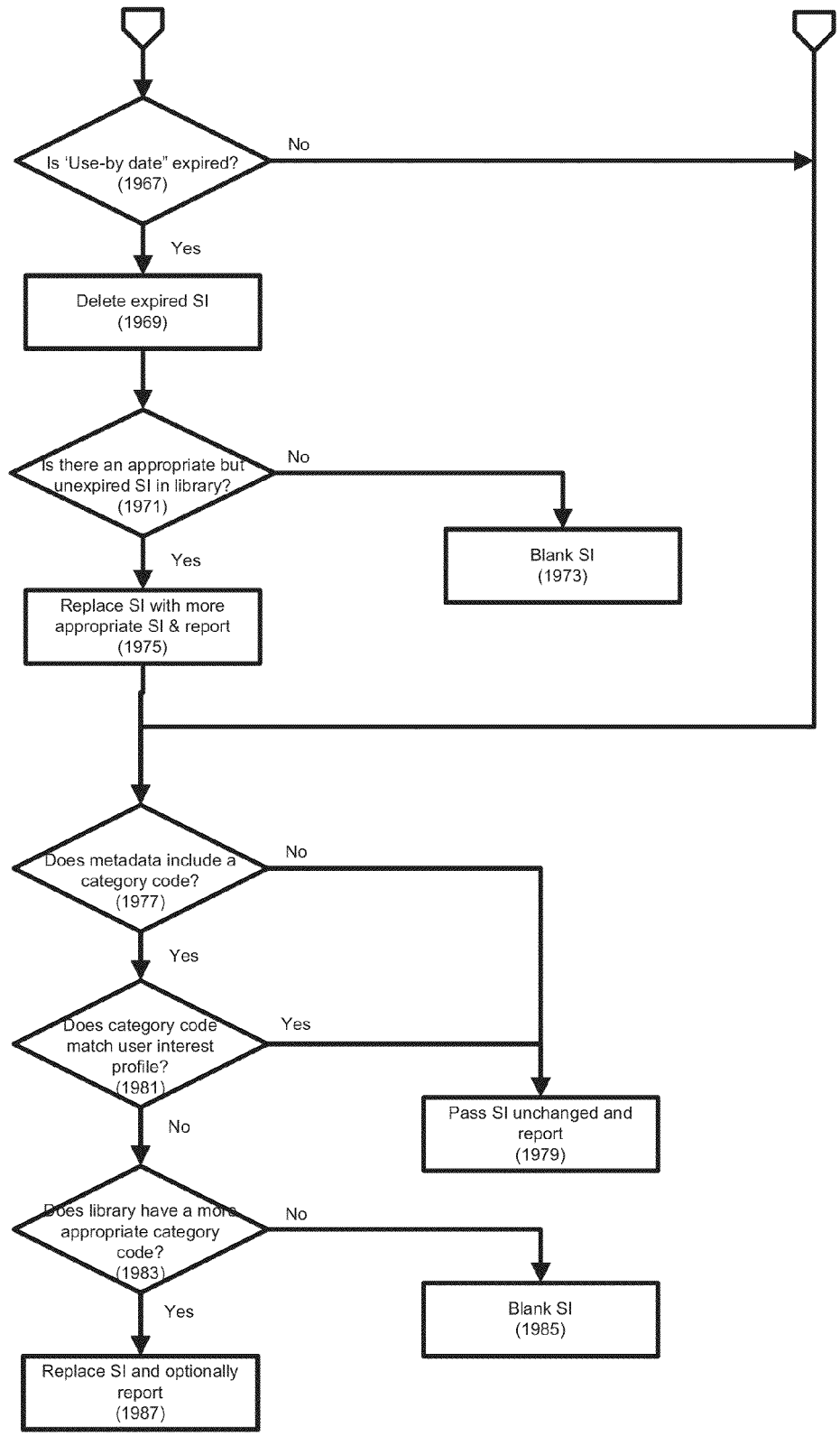
*Fig. 19 (Part 2)*

SYSTEM FOR SCANABLE ICON DETECTION AND MANAGEMENT

RELATED APPLICATIONS

This application claims the benefit of all of U.S. Provisional Application Ser. No. 61/574,459, filed Aug. 3, 2011, for a "System for scannable icon (SI) detection and management," U.S. Provisional Application Ser. No. 61/627,619, filed Oct. 14, 2011, for a "Method for more efficient collecting of information," U.S. Provisional Application Ser. No. 61/690,097, filed Jun. 19, 2012, for a "Method for more efficient collecting of information," and U.S. Provisional Application Ser. No. 61/690,104, filed Jun. 19, 2012, for a "System for scannable icon (SI) detection and management," the entire contents of each of which are incorporated by this reference.

FIELD OF THE INVENTION

The field of this invention is in the area of the application of predetermined graphical images, barcodes and similarly encoded information in video, including, but not limited to, advertising.

Barcodes and similar encoded information have been used to identify products for a years. These barcodes have evolved and now appear in several forms. Recently, smart-phones, Wi-Fi connected hand-helds, and other devices have included applications, called "apps" which can read these barcodes and other symbols. Two dimensional barcodes, called QR (Quick Response codes) codes have been used to direct these devices to web sites for more information including advertisements. These QR codes are found in magazines, newspapers, books, signs and other places where convenient access to more information would be helpful. QR codes have been used in video, but with difficulty. The prior art systems rely on an optical path; e.g. between the display and camera, and therefore require a display device.

Bar codes and QR icons can be displayed in many graphical forms, from print media to electronic screens. Traditionally, they have been recovered by fixed optical scanners for local application. These applications include barcode scanning of merchandise and more recently when down loaded to a smart phone to serve as a boarding pass for airline travel. Recently a groundswell of these symbols is seen in print media.

Mobile devices such as smart-phones, iPods, iPads, and similar products are increasingly used to connect with broadcast streams which were once intended only for reception by television receivers in fixed locations. These 'second screen' applications currently are just alternate displays, merely duplicating the Scanable Icon in another location. Digital transmission of images and video are now also directed toward mobile devices which can capture and retain SIs. There are three distinct groups of users which are not currently candidates for interaction with SIs: 1) Over The Air, OTA, receivers, 2) satellite delivered services, 3) cable delivered services. These three categories of receivers lack the hardware and software needed to take advantage of SIs. Because content is increasingly delivery insensitive, it is likely that more and more SIs will be included in program streams where in many circumstances they will fall into the three categories mentioned above.

BACKGROUND OF THE INVENTION

The prior art involving QR and other codes in video requires a viewer to have a smart-phone or similar device ready to take advantage of barcodes that briefly and often without warning appear on the television screen. Viewers using older television receivers with picture tubes (often called CRTs for Cathode Ray Tubes) frequently have even more difficulty than viewers with flat screens when attempting to capture these codes. This is because of the difference in the way images are created with a CRT verses a flat panel display. This means the smart-phone or similar device must be turned on and have the barcode reader application running so that the barcode can be captured. This is not a realistic expectation. The problem is somewhat alleviated when the viewer uses a Video Cassette Recorder, VCR, or a Digital Video Recorder, DVR, such as a TiVo box which can be paused or rewound to the appropriate screen. But even there, the viewer will only go thru this trouble when highly motivated. Intermediate to low motivation will not result in action to capture the SI.

The elderly and the techno-phobic are even less likely to participate.

The prior art systems rely on an optical path; e.g. between the display and the device's camera, and therefore require a display device.

'Second screen' applications in the prior art suffer from the same limitations as primary screens.

SUMMARY OF THE INVENTION

In this document, QR codes, barcodes and similar encoded information embedded in video will be sometimes be referred to as a "Scanable Icon," "SI," "predetermined graphical image," or "PGI". The term "SI" is meant to include all of these forms of encoded information. Here, scanning means the searching for, locating and decoding of the SI which embodies the information of interest. Use of any of these terms in the singular should be interpreted where appropriate to refer to multiple of them, including those that simultaneously could appear and be processed from a single given screen.

An object of certain embodiments of the present invention is to overcome the limitations of the prior art.

Another object of certain embodiments of the invention is to make capturing of the information in SIs and similar encoded information embedded in video automatic and easy.

Another object of certain embodiments of the present invention is to enable more relevant SIs and similar encoded information to be substituted for less relevant SIs and similar encoded information embedded in video or to substitute a graphic or video patch when no relevant SI is available.

Another object of certain embodiments of the present invention is to enable the collection of coupons associated with video to be easily accomplished by the viewer and to minimize the burdens of this task.

Another object of certain embodiments of the present invention is to avoid the need for an optical path between a display and an SI decoding or presentation device.

Another object of certain embodiments of the present invention is to avoid the need for a display in a system for capturing SIs.

The coded data sequence of the SI is generated by a source provider which can be an advertiser, an information provider, a broadcaster, a cable or satellite network, or any intermediate signal processor between the signal originator and the end user.

Locating SIs within a program data stream enables archiving them and other applications. Those applications include but are not limited to, elimination of the SI in downstream transmissions, substitution (drop/add) by a more suitable replacement SI or replacement with a logo, graphic, text or other video material.

This process can occur in at least two broad ways. First, in a complex stream such as a multiple channel MPEG feed the process is accomplished by concurrent simultaneous processing in parallel with the MPEG feed. The stream is broken down into one or more streams by Packet ID (PID) filtering; i.e., the video stream(s) is isolated and decoded. It is also to be understood that certain streams may be protected by coding such as Conditional Access (CA) and access to the appropriate decoding keys will be necessary. The video stream(s) is analyzed for identification of one or more SIs. The time interval (duration), size, and coordinate location when the SI within the video image is identified and stored as well as the actual data information contained in the SI. The substitution signal (icon, logo, graphic, text or video) is encoded and replaces the subject SI. Buffering of the main channel, to capture the segment of video containing the SI and slow that segment down, may be required depending on the finite speed of concurrent processing and complexity of the required tasks to suitably formulate the substitution signal. The example would be appropriate for utilization in a transmission network such as, but not limited to, a cable system.

Second, SIs can be identified and acted upon in a single video stream either digital or analog, such as a conventional stream. In the digital case, identifying takes place after MPEG decoding. In this case the video stream is analyzed for identification of one or more SIs. The time interval (duration), size (space occupied in the overall screen display), and coordinate location within the video image is identified and stored as well as the actual data information contained in the SI. The substitution signal (icon, logo, graphic, text, and video) is interposed in the video data stream to replace the received SI. This process is most likely to occur within a set-top or integrated receiver with a local video display.

With respect to management of SIs on video display devices, a system for identifying an SI in a video data stream, which usually is part of a complex program data stream, can be provided. MPEG packets of video, sound, control commands, ancillary data such as captioning and program IDs constitute the program data stream and are intermingled within a single data stream. Commonly, a plurality of program data streams (typically six to as many as ten or even more) are transported over a single bit stream which is transmitted in a single six Megahertz (in the U.S.) television channel. The goal is to locate and recover the data which constitutes the SI in the complex data stream. This is accomplished by a parallel and separate detection system. The video data bit stream is isolated from other data packets.

The video data bit stream is processed to identify the presence, size and location (X and Y coordinates in the displayed image). The system can be programmed to do one or more of the following functions: 1) capture the data out of the SI for use in another application, 2) mask the SI, 3) substitute (remove and replace) a similar SI or 4) replace the subject area with a video image, such as a visually recognizable logo, graphic, Uniform Resource Locator (URL), email address, or telephone number.

These capabilities can operate autonomously, that is to say through resident commands, or they can be selectively controlled by a series of global, regional, or user specific commands implementing services or features such as targeted advertising. The expression autonomous migration refers to this processing taking place without human intervention.

The system can be inserted within a transmission network for management of one or more downstream devices or located at a user location so as to manage the local displays.

Small icons have been used in the prior video art as an overlay or an inlay in the video programming, for example, to identify the network or broadcaster providing the video. SIs (predetermined graphical images) are fundamentally different from these prior art icons because SIs include a coded data sequence as a pattern of light spots (and sometimes color spots) in the SI rather than merely indicate the program source. In some cases, an icon has been used in prior art interactive television systems as a location on the screen where a cursor can be placed to access additional information. The SI of the present invention is different from these prior art icons in at least the following ways: the SI can be controlled by the source or a subsequent signal processor, the SI can show its history within its four corners, and the SI can be updated, replaced, or blanked to keep its information current.

Accordingly, there is provided a system for managing information relating to a predetermined graphical image that includes a coded data sequence, the predetermined graphical image included in an analog or digital video signal, the data sequence generated by a source provider, the system comprising:

a. A data stream processor configured to receive and process one or more analog or digital video signals;

b. A video decoder configured to decode at least one of the analog or digital video signals in order to generate a digital video data stream;

c. A graphical image detector configured to receive a digital video data stream from the data stream processor or the video decoder, and to locate in the video data stream, data corresponding to the predetermined graphical image;

d. A lookup table configured to receive information relating to detection parameters for one or more different types of graphical images that include coded data sequences, and to provide information relating to detection parameters for the type of the predetermined graphical image to the graphical image detector;

e. A graphical image decoder configured to receive information from the graphical image detector and to decode the predetermined graphical image in order to extract at least some of the data in the data sequence of the predetermined graphical image;

f. A first library configured to receive from the graphical image decoder decoded information from the predetermined graphical image and ancillary information relating to the predetermined graphical image, the ancillary information relevant to the analog or digital video signal that includes the predetermined graphical image.

In some embodiments, the system's video decoder converts analog information from the data stream processor to a digital signal.

In some embodiments, the ancillary information includes information relating to the analog or digital video signal in which the predetermined graphical image is included; the time that the predetermined graphical image occurred in the signal; and a program identification relating to a program within which the predetermined graphical image occurred.

In some embodiments, the lookup table is configured to receive from a multiple channel video provider information relating to detection parameters for one or more different types of graphical images that include coded data sequences.

In some embodiments, the predetermined graphical image is a two dimensional coded image.

In some embodiments, the predetermined graphical image is a one dimensional coded image.

In some embodiments, the predetermined graphical image is a quick response code.

In some embodiments, the graphical image detector is configured to conduct error correction on the coded data sequence included in predetermined graphical image, and to provide information related to the error correction in order to indicate figure of goodness for a transmission path of the predetermined graphical image.

In some embodiments, the system is included in a subscriber unit and the data stream processor is configured to receive and process one or more analog or digital video signals from a video provider.

In some embodiments, the system is included in a processing facility of a video provider.

In some embodiments, the system includes a video replacement generator that is configured to receive signals from the video decoder and information contained in the first library, and to provide signals that contain a replacement graphical image that includes a coded data sequence.

In some embodiments, the system includes a video replacement generator that is configured to receive signals from the video decoder and to provide signals that do not contain a graphical image that includes a coded data sequence.

In some embodiments, the system includes a video replacement generator that is configured to receive signals from the video decoder and to provide signals that contain indicia to indicate that a graphical image that includes a coded data sequence has been provided to the first library.

In some embodiments, the system is configured to provide a video data stream that replicates at least some signals provided by a video provider.

In some embodiments, the system is configured to provide at least some of the data sequence included in the predetermined graphical image via wired or wireless connection.

In some embodiments, the system is included in a user unit and is configured to provide coupon information in the coded data sequence included in the predetermined graphical image for output to a printer, smartphone, wireless device, or privilege fob.

In some embodiments, the system is included in a user unit and the first library is configured to provide at least some of the decoded information from the predetermined graphical image and ancillary information relating to the predetermined graphical image to a user device for searching and use by a user.

There is also provided a system for managing information relating to a predetermined graphical image that includes a coded data sequence, the predetermined graphical image included in an analog or digital video signal, the data sequence generated by a source provider, the system included in a processing facility of a video provider, the system comprising:

a. A data stream processor configured to receive and process one or more analog or digital video signals;

b. A video decoder configured to decode at least one of the analog or digital video data signals in order to generate a digital video data stream;

c. A graphical image detector configured to receive a digital video data stream from the data stream processor or the video decoder, and to locate in the video data stream, data corresponding to the predetermined graphical image;

d. A lookup table configured to receive information relating to detection parameters for one or more different types of graphical images that include coded data sequences, and to provide information relating to detection parameters for the type of the predetermined graphical image to the graphical image detector;

e. A graphical image decoder configured to receive information from the graphical image detector and to decode the predetermined graphical image in order to extract at least some of the data in the coded data sequence included in the predetermined graphical image;

f. A first library configured to receive from the graphical image decoder decoded information from the predetermined graphical image and ancillary information relating to the predetermined graphical image, the ancillary information relevant to the analog or digital video data signal that includes the predetermined graphical image; and g. A second library configured to receive at least some of the information in the first library and local control or downloadable instructions, and to output information relating to the coded data sequence included in the predetermined graphical image and the ancillary information relevant to the analog or digital video data signal that includes the predetermined graphical image, to at least one media insertion and management processing facility.

In some embodiments, the second library is configured to output information relating to a data sequence included in a first predetermined graphical image and ancillary information relevant to a data signal that includes the first predetermined graphical image, to a first media insertion and management processing facility, and to output information relating to a data sequence included in a second predetermined graphical image and ancillary information relevant to a data signal that includes the second predetermined graphical image, to a second media insertion and management processing facility.

There is also provided a method for managing information relating to a predetermined graphical image that includes a coded data sequence, the predetermined graphical image included in an analog or digital video signal, the data sequence generated by a source provider, the method comprising:

a. In a data stream processor, receiving and processing one or more analog or digital video signals;

b. In a video decoder, decoding at least one of the signals and generating a digital video data stream;

c. In a graphical image detector, receiving a digital video data stream from the data stream processor or the video decoder, and locating in the video data stream, data corresponding to the predetermined graphical image;

d. In a lookup table, receiving information relating to detection parameters for one or more different types of graphical images that include coded data sequences, and providing information relating to detection parameters for the type of the predetermined graphical image to the graphical image detector;

e. In a graphical image decoder, receiving information from the graphical image detector and decoding the predetermined graphical image to extract at least some of the data in the data sequence of the predetermined graphical image; and f. In a first library, receiving from the graphical image decoder decoded information from the predetermined graphical image and ancillary information relating to the predetermined graphical image, the ancillary information relevant to the data signal that includes the predetermined graphical image.

In some embodiments, the method is practiced by a user.

In some embodiments, the method is practiced by a video provider.

Some Principles that May be Taken into Account in Certain Embodiments of the Invention to Find SIs (Predetermined Graphical Images) within Active Video A SI is likely to appear for more than n seconds The SI is likely to remain in a fixed location with X and Y coordinates in the video.

That location is, for English speaking countries, likely to be in the lower portion of the screen and probably not centered (e.g. left or right)

QRs have a built-in precursor to aid recognition. These are in the form of 'boxes' of specified relative size and located at specific places within the QR image. SIs have a similar 'run in code'. A library (The icon lookup table) of these aids can be made a part of the search engine which finds the SIs.

One example of a recovery process would capture a number of MPEG I-frames (or similar images) and assemble them and look through them for the precursor 'box' using a form of auto correlation by building up an additive signature from the successive layers. Software which locates specified patterns in an image are well known in the art. For example, many still picture digital cameras and many camcorders come with "face recognition" features which aid in focusing the camera on the portion of the image of most interest. The Sony high definition camcorder model HDR-CX160 has a feature which even recognizes when the faces are smiling and automatically captures a photograph under those circumstances.

Once a QR code box candidate is found, rigorous search may be conducted in the neighborhood, plus/minus 'one QR' size (determined as a ratio of QR to found box) to orient and establish recovery schemes which can include conventional schemes.

Helper signal options can include, but are not limited to: 1) a flag in a less visible area of the image such as the over-scan, 2) in analog signals, a message in the Vertical Blanking Interval (VBI) which designates that a SI is present with these X Y coordinates, 3) ancillary data in the MPEG data stream which locates the SI. The helper signals can be used to accelerate SI detection but are not essential to the process.

BRIEF DESCRIPTION OF THE DRAWINGS

FIG. 19 is a flow chart of a method of passing, blanking, or replacing an SI based on a User Interest Profile.

DETAILED DESCRIPTION OF THE DRAWINGS

101 Data Stream Processor

Figure 1:
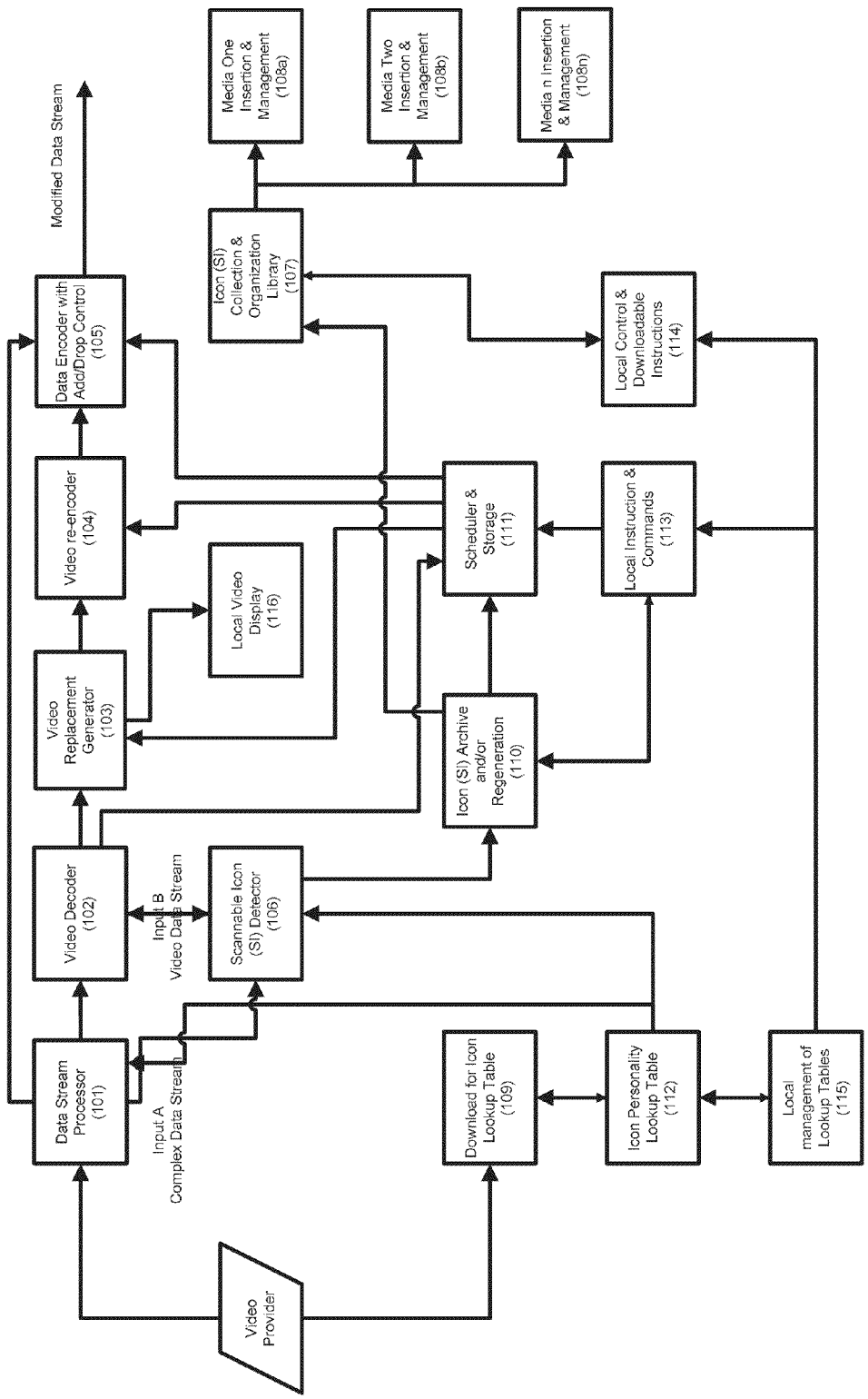
FIG. 1 (also termed "Drawing One") is a generalized schematic diagram of one embodiment the present invention. Various other embodiments will use some of the Elements of FIG. 1

With reference to FIG. 1, where numerals in this text generally refer to items in the drawings that correspond as shown to such numerals, Element 101 receives signals from a Video Provider and extracts a stream which includes the desired video signal for processing and passes the rest of the signals on to Element 105 for subsequent reassembly into a modified Video Provider data stream. The signals passed on to Element 105 also include the non-video portions (audio, closed captioning, identification, ancillary signals, meta-data signals, etc.) of the program signal to be processed and they can include non-actionable videos.

The signals from the Video Provider comprise signal streams which could be analog television streams or digital television streams or a combination of both analog and digital streams. As one of ordinary skill in the art would know, these signals could be baseband signals, modulated analog signals, digital signals modulated in many different ways (ATSC, QAM, QPSK, etc.) or Internet Protocol or other digital signals. Digital signals can be in any of the MPEG formats or other digital signal formats. Different Video Providers may have dissimilar signal propagation properties and the optimum modulation method for each is unique.

Video is also delivered to computers and computer-like devices over the Internet and radio connections to the Internet. In addition, several methods of delivering video to smartphones and cell phones have been developed. All of these video delivery methods are encompassed by various embodiments of the present invention.

One generally important feature of Elements 101 and 102 is to extract the relevant video signal which is materially determined by the user.

Element 101, the data stream processor, is a general representation of a device which selects one program stream out of the usual multichannel stream from the Video Provider. The Video Provider may be a broadcaster with a single program stream, a broadcaster with a multichannel digital stream or a multiple channel video provider such as a cable or Direct Broadcast Satellite, (DBS) system. Element 101 typically includes a tuner, a demodulator/decoder for various digital modulation methods and a demultiplexer for extraction of specific digital signals. Single or multiple digital television streams may have been multiplexed into a specific complex stream. Single channel analog television signals selected by a tuner in Element 101 can be passed for subsequent processing at Element 102, the video decoder. Depending upon the number of data streams supplied by the Video Provider additional Elements 101 and 102 may be applied. In Element 102, analog video is converted to digital to simplify the detecting process in 106. the SI detector (graphical image detector).

The nature and format of the material sent by the Video Provider will dictate the style and format recovery necessary for a specific situation.

Element 101 optionally receives instructions on which data stream to focus its search attention; these instructions are provided by Element 112, the Personality Lookup Table.

102 Video Decoder

If the signal from Element 101 is an analog signal, Element 102 demodulates it and passes a baseband analog signal to Element 103. Element 101 converts the analog signal to a digital signal for use by Element 106 and Element 111. If the signal from Element 101 is a single digital stream, Element 102 decodes it and passes a baseband analog signal to Element 103, while passing the digital signal to Element 106 and Element 111. For the system to be useful as intended, additional collateral information beyond what is included in the SI is required. That collateral information is called an ancillary wrapper because it defines an historical record of how the SI was discovered. That ancillary wrapper falls into two broad categories. The first category identifies information as to where the video stream was found. This includes but is not limited to the origin of the channel, such as Meta-data carried along with the program, the RF channel, the complex data stream, and the PID. The second category is information learned after the successful detection and decoding which occurs within Element 106, that includes but is not limited to the type of SI recovered, the duration, its location within a visible screen and its size with respect to the visible screen, even though a visible screen display is not required. Collectively that data SI payload and these attributes comprise the resource placed in the storage 111 and library 107. At Element 110, an unambiguous time stamp is added to the attribute wrapper to memorialize the time of the event. Time-To-Live, TTL, in print media is static because throughout its life, its image remains unchanged. Video is dynamic, where an older video is seen can span decades. The relevance of certain video information includes that of the data payload of an SI can cease to be of consequence, and for what every reason, it would be useful to create a "use-by-date" for the resources added to the library. The use-by-date could be applied to eliminate dated material or simply to express within the attribute wrapper that the material is stale. Multiple Element 102 functions may be employed to simultaneously operate on more than one program stream.

Element 106 optionally passes Personality Lookup Table signals from Element 112 to Element 102.

The primary purpose of Element 102 is to extract a single video stream. That stream could be analog or digital. In the interest of detector/decoder efficiency at Element 106, an analog signal at Element 102 could be up-converted to MPEG so that either an analog or digital signal at Element 102 arrives at Element 106 through input B as digital, typically MPEG, signal.

103 Video Replacement Generator

Element 103 modifies the selected video stream. In the case of the local video display, Element 116, additional information such as sounds and Metadata are added back for the local video display. Payload and attribute information held in Element 111 is triggered by Element 113 and elsewhere for modification of the video seen at Element 116. That modification could include removing the SI, replacing it with a replacement graphical image that includes a coded data sequence found in the scheduler Element 111, all of which is under the management of Element 113 and earlier, which oversees the process of replacement information management. The SI may be replaced by an indicia to indicate that a graphical image that includes a coded data sequence has been provided to the first library. The graphic may consist of a logo that indicates to the viewer that an SI has been captured and stored. This may be called a "Gotcha Logo".

Element 103 receives a single digital or analog video signal (as dictated by the configuration of the transmission and display architecture) from Element 102 and replaces the SI area in near real time with a selected SI or other video provided by Element 111 and passes the modified complete video stream to Element 104 and Element 116 for optional local video display.

Element 103 receives scheduling information from Element 111. This information can include X and Y coordinates and time of occurrence of SIs that are to be passed on or replaced with other SIs, graphical information or video.

104 Video Re-Encoder

Element 104 retrieves and resizes the video stream from Element 103.

If the signal is intended for more than just local display, further processing is necessary. Element 104 receives the analog signal from Element 103 and buffers it as necessary to compensate for other system processing delays, analog or digital. Timing information from Element 111 directs and coordinates the passage of the signal to Element 105.

105 Data Encoder with Add/Drop Control

This detection process is novel alone to the present application, among other features. In the prior art, the user observes the size and position of the SI of interest on the screen of the smart-phone. The path of intelligence was from a video display thru an optical path to the direction of the smart-phone's camera and moved in and out and around about to position the Si which the prescribed image area as dictated by the smart-phone. This image had to remain in place long enough for the smart-phone to capture the image. In the case of certain embodiments of the instant invention because they work on one or a few images extracted from an MPEG stream they are otherwise frozen in time, and thusly this process does not require an unobstructed optical path during the time required for decoding.

With respect to the decoder process within Element 106, there are any number of conventional applications for optical recovery [e.g., ZXing, RedLaser, NeoReader, and Kaywa] which can be modified by a person understanding the steps existent in SI detection programs. These existing software applications assume the environment of a smart-phone whose camera is directed by the user into the vicinity of the SI. Many are capable of multiple SI formats, both one and two dimensional. ZXing in particular has its source code published and in the public domain. A person of ordinary skill will understand that while the human intervention of moving the camera around to center the portion of the bit stream which contains the relevant SI in a 'detection box' significantly narrows down the detector's search area, the actual detection of patterns (which must precede the actual decoding of the SI) will follow a process similar to that described in the Element 106 and in FIG. 12. It should also be appreciated that none of the above-named applications are capable of grabbing more than one SI at once, though applications according to certain embodiments of the invention may be so capable.

Element 105 optionally may be included in a processing facility of a video provider. The video provider may be a cable operator who has processing facilities consisting of cable headends and cable hubs. These processing facilities may modify the SI signal for non-local use by altering, deleting, replacing, or masking the SI with other signals (such as graphics or video). The replacement SI or other signal is obtained from Element 111 along with scheduling signals. Element 105 adds back the non-video portions (audio, closed captioning, identification, ancillary signals, meta-signals, etc.) of the program signal that was processed. Element 105 also recombines the modified channel with the other channels or streams obtained by the bypass connection from Element 101.

106 SI Detector

Element 106 is where the desired video information is extracted by technologies such as MPEG stream disassembly in order to create a stream for SI detection. At Element 106, the information that constitutes the video image is examined, searching for known SI properties (finder patterns, run-in codes, etc.) that indicate the presence of the desired SI. The SI usually contains Forward Error Correction (FEC) codes which can be used for error detection and error correction of some errors. The degree of required correction is an indication of the quality of the transmission path and can be expressed as a figure of goodness. This information can be preserved as part of the history of the SI as it is processed and used in different applications and in various parts of the system.

Element 106 is comprised of two parts. The first part identifies the presence of an SI in the stream and its location and size.

Then the action of the second part takes place. The area of the video stream containing a desired SI is decoded by conventional methods such as those used in smart-phones physically held to view the relevant area of a video display.

Element 101 and Element 102 in conjunction with user interaction and/or selection have reduced the complex input stream to a single actionable video. That video is always digital and nominally MPEG. Even though the signal extracted by Element 102 may have been analog, it was up-converted to digital form. This simplifies the complexity of the Personality Lookup table 112 and the processes used in the detector portion of Element 106.

Element 106 receives an analog or digital video signal from Element 102 on Input B and performs SI recognition. Alternatively, complex data stream digital signals are optionally provided on Path A from Element 101 for SI recognition. Audio, meta-data, and all of the Packetized Elementary Stream (PES) for the selected digital program are sent to input A of the Scanable Icon detector Element 106. Element 106 extracts the relevant video data from Input A. In either the input A or the input B case, SI and collateral information, such as channel source, unique ID and a timestamp are sent to Element 110.

Element 106 receives Icon Personality information from Element 112.

Occasionally, video includes an SI that is in the scene before the camera. The SI wasn't intended to be inserted into the video; it is accidentally included. Element 106 can make an accidental discovery of this SI and add it to the memory as an additional asset.

107 Icon Collection and Organization Library

The first library which exists in Element 110 is referred to as Archive and Storage is intended for interaction with the local display Element 116 and also for modification of a portion of the bit stream brought together in Element 105. The second library organized at Element 107 and managed by Element 114 et al is intended to place "on the shelf" resources for use in other media, the family Elements 108, which is not a constituent of the hosting stream (Video Provider).

A purpose of Element 107 is to maintain a library of SI elements and their ancillary wrappers for use in other signals. Those other signals are expected to be video, although they need not be. As an example, the library as managed by Element 114 and elsewhere could be WI-FI ported. This includes signals which may or may not be video based. That porting could be in the form of an air-based or wired signal. That data stream could be used to provide supplementary information of interest to the viewer, text to voice translation, and/or translation to other written or audible spoken languages. Information that has been selected for its content—such as URLs—that is carried in the channel's meta-data could also be captured and inputted to the Element 110 and Element 107 libraries and/or ported to Wi-Fi for management and retention by a smart-phone application. This is a distinctive feature which is an example of a non-SI being brought into the SI library and/or off loaded to a smart-phone or similar device as well as made available to the Family 108. Because library Element 107 is under management of Element 114, the library's contents could be managed for each of the family Elements 108 (a, b, . . . n) independently.

Element 107 and its attendant management from Element 114 and elsewhere can provide a unique set of resources to each of the family Element 108 or simply transfer the entire contents of Element 107 to the family Element 108.

108 Media Insertion and Management Processing Facility

Elements 108 (a, b, . . . n) manage the insertion of SIs received from Element 107 into their respective Media streams.

109 Download for Icon Lookup Table

Element 109 optionally receives a stream of instructions nominally supplied within the Video Provider stream enumerating the available SIs and scheduling information. Element 109 also receives Personality Lookup Table input from Element 112 to assist in this process.

110 Icon Archive and/or Regeneration

Element 110 is the central repository or library of detected information regarding predetermined graphical images, SIs, and ancillary information relating to the predetermined graphical images stored in a file or in a regenerated file by applying Forward Error Correction, FEC, signals, if available. The ancillary information includes Metadata regarding the SI, for example, a description of the subject matter of the SI, its source, expiration date, etc. The ancillary information may also include the channel or program identification which contained the SI, the time the SI occurred and date it arrived, the program in which it occurred and/or its duration. Element 110 receives the SIs from Element 106 and local instructions and commands from Element 113.

Element 109 assists in the assembly of the icon lookup table. Element 109 receives instruction, in-band or out-of-band, from the Video Provider and passes that information on to Element 112, the Personality Lookup table. Additionally, the Personality Lookup table, Element 112, can have a suite of pre-loaded attributes and comes under the local management of Element 115. That local management can modify the lookup table.

111 Scheduler and Storage

Element 111 collects SIs from Element 110 and under control of Element 113 presents selected SIs and scheduling information to Element 103 and Element 105 to accomplish the drop/add function for local and non-local applications.

Element 111 also optionally receives analog or digital video signals (as dictated by the configuration of the transmission and display architecture) from Element 102 for storage.

112 Icon Personality Lookup Table

Element 112 maintains a personality lookup table providing information relating to detection parameters to assist Element 106 in performing multiple detection routines, to permit detection of different classes or types of graphical images or SI's. The detection parameters define the type of predetermined graphical image used and optionally some details regarding it location and size. This lookup table can be installed at time of manufacture, downloaded, in-band or out of band, from the Video Provider or the multiple channel video provider via Element 109 or locally managed by Element 115, which sets its instruction (management) status under downloadable control or locally (not shown, but implicitly part of the management function interconnected from Element 115). The Personality Lookup Table is dynamic in that personalities may be added or deleted and any subset may be sent to Element 106 to support the recovery of SIs in Element 106.

Personality codes in the Personality Lookup Table designate the type of SI, whether QR, barcode, Microsoft graphical code, or some new code yet not invented. The personality lookup table can also be set to trap specific streams (such as URLs) from the channel's meta-data.

113 Local Instructions and Commands

Element 113 manages selection, schedule and timing for replacement SIs in Element 111. Control and instruction can be provided by local control signals or downloadable instructions from Element 115.

Element 113 also has access to Element 110 to direct it to retain or dispose of SIs; i.e. to help manage the inventory of SIs.

114 Local Control and Downloadable Instructions

Element 114 provides downloadable instructions and/or local control of Element 107 for insertion in the media streams of Elements 108 a, b . . . n) These control and downloadable instructions can be provided by Element 115.

Element 114 also receives feedback signals from Element 107 apprising it of the contents of the Library. These tasks can include but are not limited to removing stale contents, updating contents and reporting Library contents back to local or upstream (remote) data centers.

115 Local Management of Lookup Tables

Element 115 provides local input and management of lookup personality table in Element 112 and provides control signals to Element 113 and Element 114.

Element 115 receives signals from the Video Provider via Element 109 and Element 112.

116 Local Video Display

Element 116 represents an optional local display which as an example is within a television receiver or set-top device. It receives its signals from Element 103. The video replacement generator Element 103 passes the relevant video to the local display. One of ordinary skill in the art would understand that the video signal is rejoined to its ancillary audio, SAP, meta-data, closed captioning, etc. Those signals have been passed through Element 101 and Element 102.

This description of the embodiment shown in FIG. 1 is not meant to limit the scope or application of the invention, merely to help describe it. Further applications and implementations will be obvious to those of ordinary skill in these arts. The dynamic application of this invention when implemented by programmers and end users will dictate subtle modifications of the embodiment shown; but otherwise within the scope of the invention. The same is true with the remainder of this Detailed Description of the Drawings section.

Further Discussion

Figure 2:
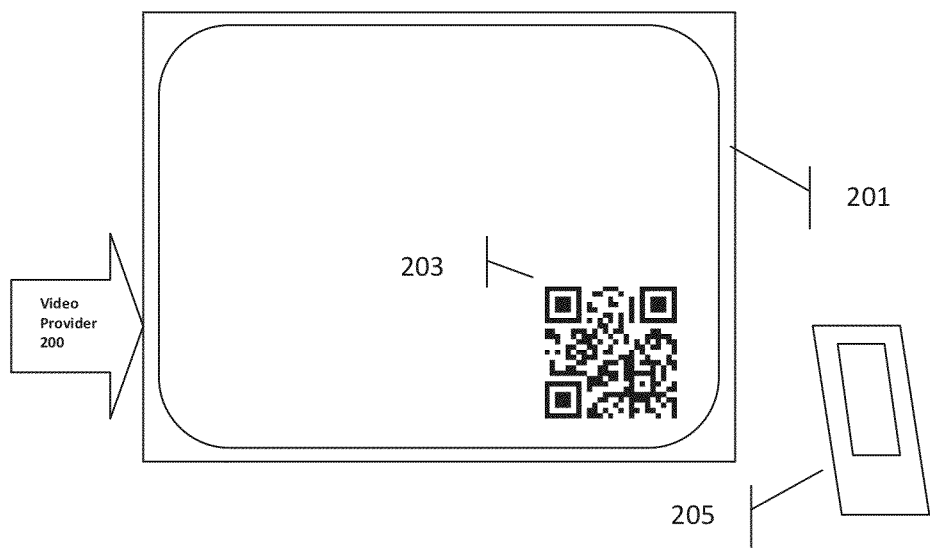
FIG. 2 depicts the prior art.
Figure 3:
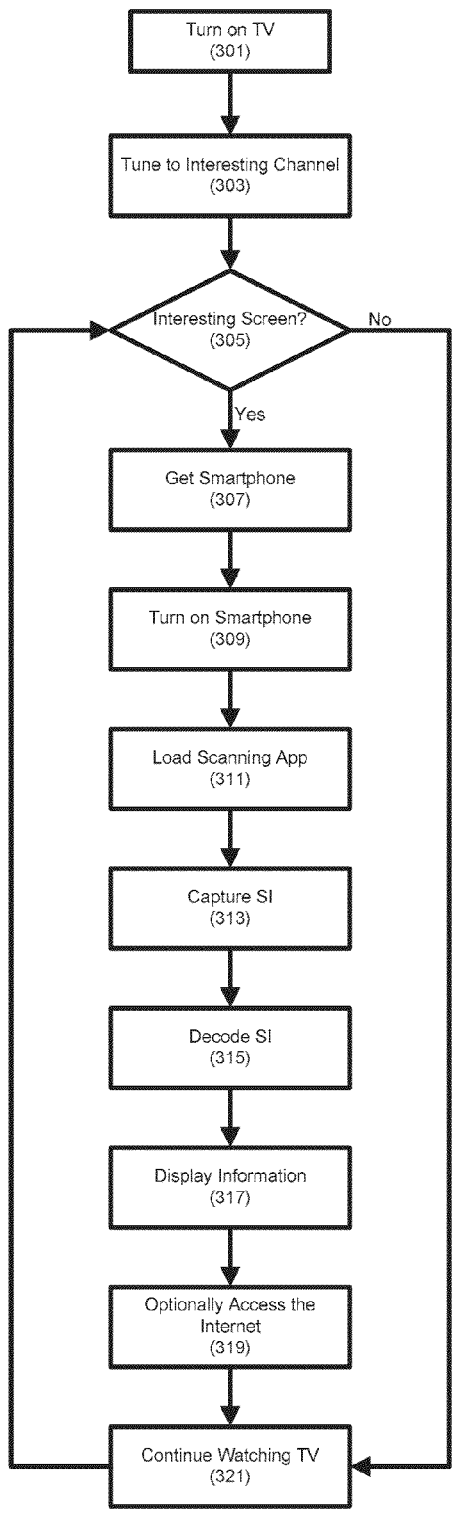
FIG. 3 is a flow chart of a method of operation of the prior art.

FIG. 2 describes the prior art and FIG. 3 is a flow chart of the operation of the Prior Art. The prior art consists of a signal input from a Video Provider, 200, a video display, 201, with an SI in the picture, 203, shown as a QR code in this example, and a smart-phone or similar device 205 which has a camera with an application loaded (not shown) that can read the SI and optional access to the Internet (not shown).

FIG. 3: The flow chart of FIG. 3 includes the steps
Step 301 Turn on TV
Step 303 Tune to interesting channel
Step 305 Interesting Screen?
If "Yes" proceed to Step 307, If "No" proceed to Step 320
Step 307 Get Smart-phone or similar device
Step 309 Turn on Smart-phone
Step 311 Load Scanning App
Step 313 Capture the SI, (QR or similar code) (Detection Phase)
Step 315 decode the SI (Decode Phase)
Step 317 display the information acquired from the code
Step 319 optionally; access the Internet using the SI
Step 321 Continue watching TV, Return to Step 305

Figure 4:
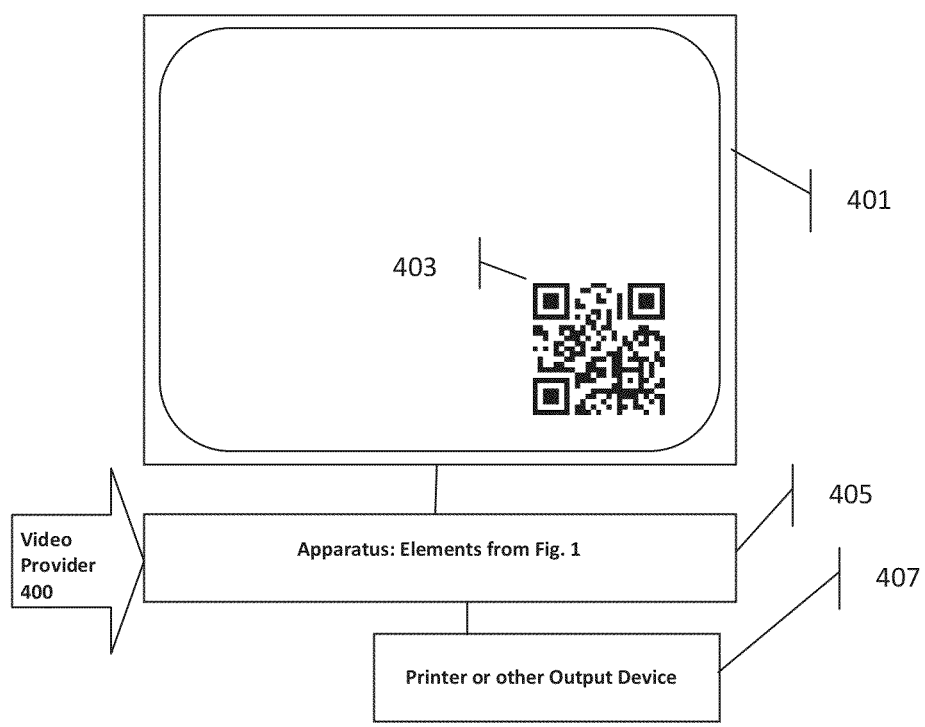
FIG. 4 illustrates some principles of the embodiment of FIG. 1.

FIG. 4 illustrates principles of operation of the embodiment of FIG. 1.

FIG. 4 includes most of the elements of FIG. 2, numbered with the same numerals to two significant digits, plus the apparatus of FIG. 1. As with FIG. 2, there is a signal input from a Video Provider, 400, video signal receiver receiving a signal with an SI, 403, in the picture, shown as a QR code in this example. However, there is no smart-phone or similar device. As previously mentioned, the system relies on no camera or visible display; there is no optical path; there is no requirement for a display. Instead, an apparatus, 405, consisting of some or all of the Elements of FIG. 1, is coupled to or built into the video signal receiver which optionally includes the video display, 401, and optionally, a printer or other output device, 407.

While previously well-known systems, such as Teletext, for conveying ancillary information in video signals are part of the prior art, the embodiment of FIG. 1 differs in that it converts visible symbols meant for use with an optical path and camera into an autonomous system. That is, the present invention does not require an optical path, camera, or even a video display.

Figure 5:
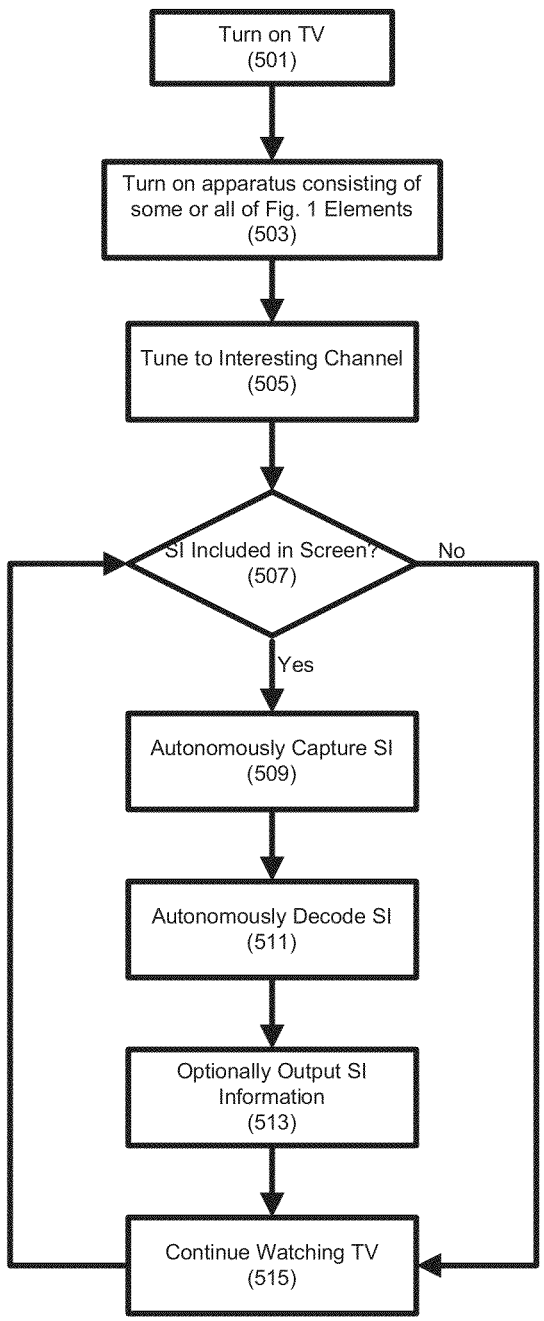
FIG. 5 is a flow chart of methods of operation of the apparatus of FIG. 4.

FIG. 5 is a flow chart for the apparatus of FIG. 4.
Step 501 Turn on the video signal receiver, a TV in this example
Step 503 Turn on the apparatus consisting of some or all of FIG. 1
Step 505 Tune to an interesting channel
Step 507 SI included in screen?
If "Yes", proceed to Step 509, if "No", proceed to Step 515
Step 509 Autonomously Capture SI
Step 511 Autonomously Decode SI
Step 513 Optionally Output SI information
Step 515 Continue watching TV, Return to Step 507

The advantages of this embodiment of the present invention include autonomous operation and migration without the need to know an SI will be displayed, find the smart-phone or similar device, turn it on, load the appropriate application, aim the device at the portion of the video display that has the SI, and capture the SI code, doing all of this in the brief time that the SI code is displayed on the screen. Additionally, the results are optionally printed or output to another device.

Figure 6:
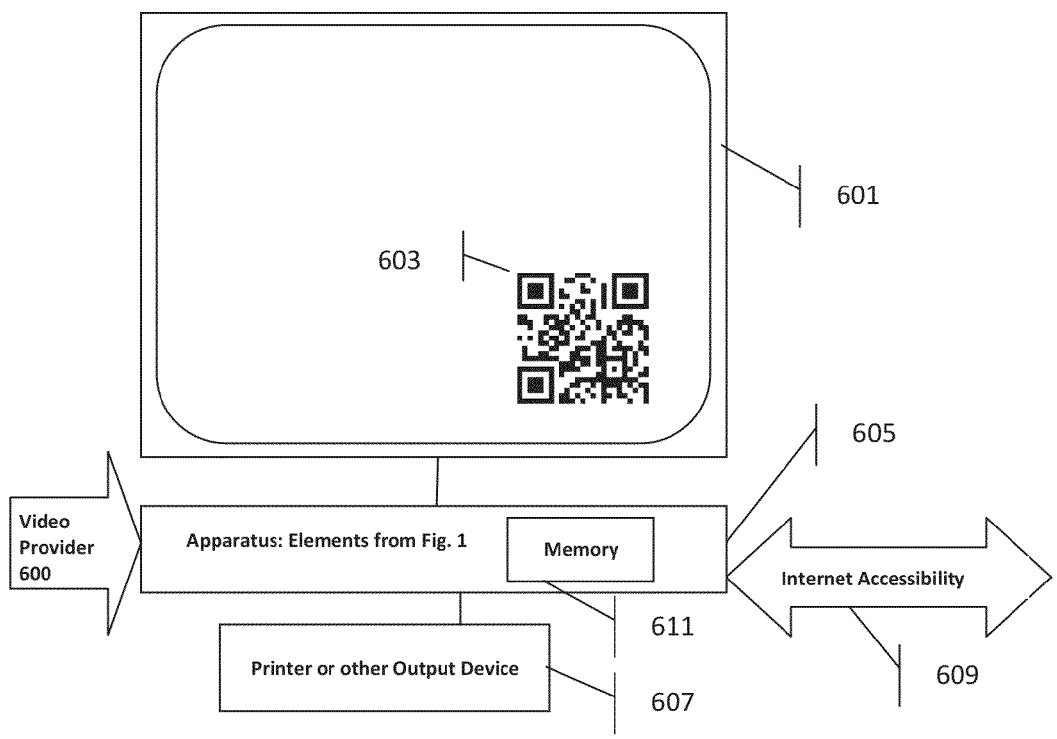
FIG. 6 illustrates the addition of Internet connectivity and memory storage.

FIG. 6 illustrates an improvement of the principles of operation of some embodiments of the present invention, adding Internet accessibility and memory.

FIG. 6 includes all of the elements of FIG. 4, numbered with the same two least significant digits, plus internet accessibility and memory. As with FIG. 2, there is a signal input from a Video Provider, 600, video signal receiver, receiving a signal with an SI, 603, in the video signal, shown as a QR code in this example. However, there is no smart-phone or similar device. Instead, an apparatus, 605, consisting of some or all of the Elements of FIG. 1, is coupled to the signal receiver, or optionally built into the signal receiver which optionally includes the video display, 601, and a connection to the Internet, 609, which may be via Wi-Fi or Category Five Ethernet cable connected to a cable television modem or some other access method, a memory device, 611, built into the apparatus, said memory device for storage of the result, and optionally, a printer or other output device, 607. Since there is no need to aim a smart-phone or similar device at the screen to capture the SI, there is no need for a screen. In this example, the output device, 607, could be a video or graphic display since the signal receiver may or may not have a video display. The receiver can be without a video display and simply serve to capture SIs. The video display is optional.

Figure 7:
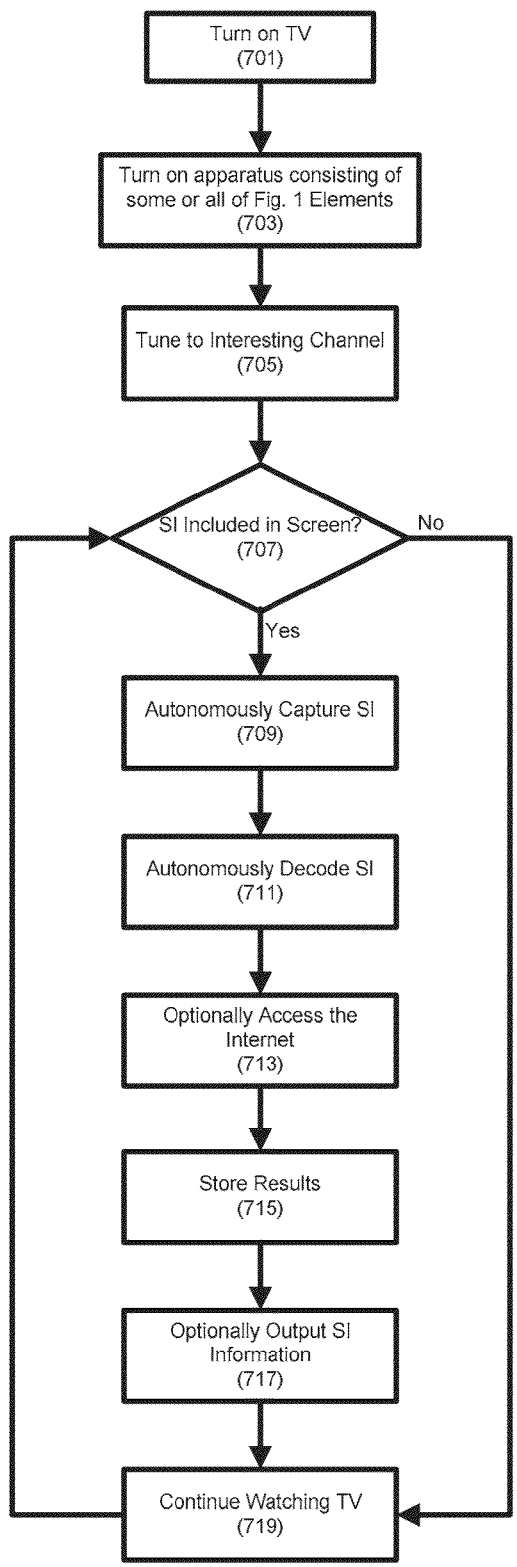
FIG. 7 is a flow chart of methods of operation of the apparatus of FIG. 6.

FIG. 7 is a flow chart for the apparatus of FIG. 6.
Step 701 Turn on the signal receiver
Step 703 Turn on the apparatus consisting of some or all of FIG. 1 Elements
Step 705 Tune to interesting channel
Step 707 SI included in Screen?
If "Yes" proceed to Step 709, if "No", proceed to Step 719
Step 709 Autonomously capture SI code
Step 711 Autonomously Decode SI
Step 713 Optionally access the Internet
Step 715 store the results
Step 717 Optionally output SI information
Step 719 Continue watching TV and return to Step 707

Autonomously reaching out to the Internet and collecting or assembling the information encoded within the SIs is a user-friendly experience. When this capability is hands free and automatic, the learning curve is lower and the satisfaction is greater. This information could then enable "collaborative tagging"—that is, the ability to look in the SI library and match it up to data associated with the currently viewed screen as discerned from perhaps meta-data, audio hashing, or a relevant SI. When the rich resources of the decoded SI and its attendant attribute wrapper comports to something similar seen on the current screen, then an "I can help" icon appears which in effect reminds the viewer that additional information is known about this topic, and could be viewed immediately or simply bookmarked for later interaction.

Figure 8:
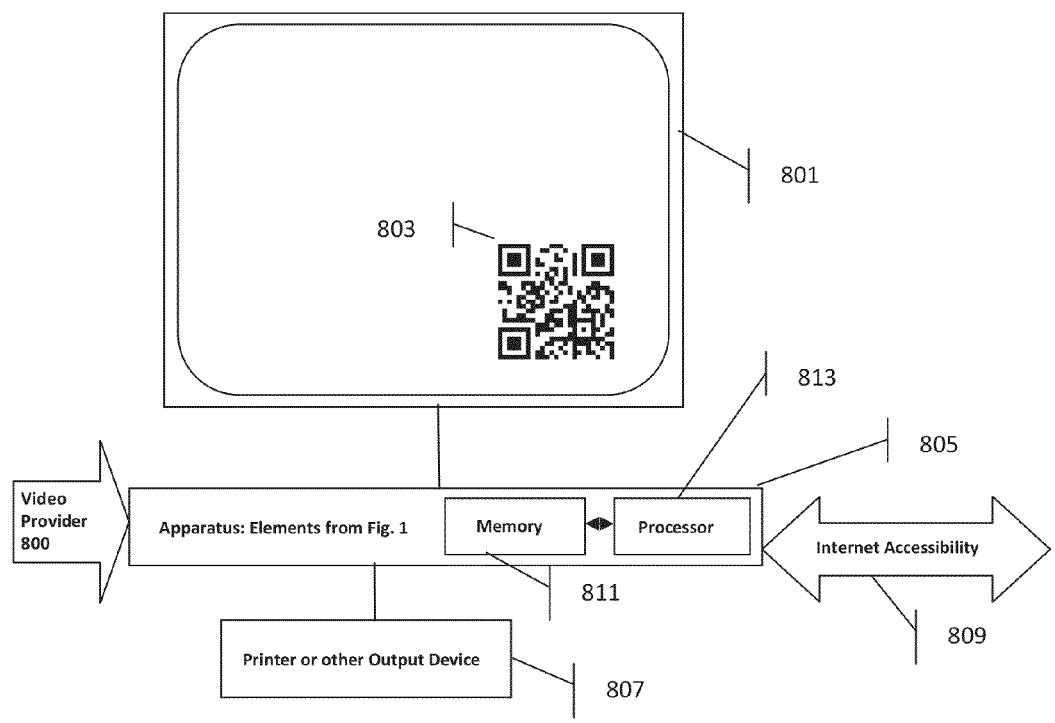
FIG. 8 illustrates the addition of a processor and software to organize a library of SIs.

FIG. 8 illustrates a further improvement of the principles of operation of some embodiments of the present invention, including adding a processor and software to organize a library of SIs.

FIG. 8 includes all of the elements of FIG. 6, numbered with the same two least significant digits, plus a processor, 813, coupled to the memory, 811, for organizing the information stored in memory 811, obtained using the SIs. The processor can run a variety of software programs to organize the stored information in a useful manner. For example, the information could be organized chronologically according to received time and date. Alternatively, it can be organized according to genre or some other category of interest to the user. Software for organizing such information is well known in the art.

When the SIs consists of coupons, the coupon information in the data sequence included in the predetermined graphical image can be sorted by the software according to some criteria of interest to the user. The coupons can then be outputted by output device 807 which may be a printer, smartphone, wireless device or privilege fob. The wireless device may be a Wi-Fi or other wireless communication enabled device such as a iPad or iPod or the like. A privilege fob is a small device with electronic memory which retains the authorization; i.e. privilege, the user has obtained entitling the user to a discount or other benefit. The device may be a "thumb drive", data card, or similar portable storage device.

Figure 9:
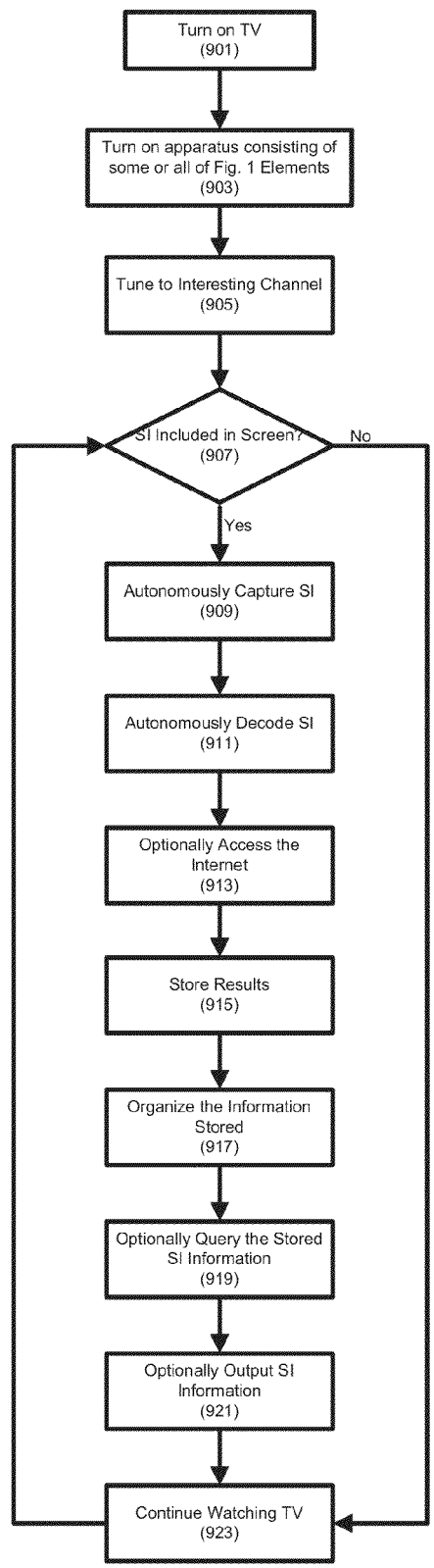
FIG. 9 is a flow chart of methods of operation of the apparatus of FIG. 8.

FIG. 9 is a flow chart for the apparatus of FIG. 8.
Step 901 Turn on the signal receiver
Step 903 Turn on the apparatus consisting of some or all of FIG. 1 Elements
Step 905 Tune to an interesting channel
Step 907 SI included in Screen?
If "Yes" proceed to Step 909, if "No", proceed to Step 923
Step 909 Autonomously capture SI code
Step 911 Autonomously Decode SI
Step 913 Optionally access the Internet
Step 915 Store the results
Step 917 Run the software in the processor to organize the stored information
Step 919 Optionally query the stored SI information
Step 921 Optionally Output SI information on the output device
Step 923 Continue watching TV, return to Step 907

The advantages of this embodiment of the present invention are several including but not limited to the following. Autonomously capturing the SIs enables the creation of a Library of programming/commercial material that is relevant to the viewing choices made by the user. It sees what the viewer sees, only more; i.e. the embedded information.

This embodiment of the present invention enables easy retrieval of previously captured SIs. It changes programming material such as commercials from invasive "right now" interruptions into useful experiences on the time schedule and terms of the viewer. This makes the commercials much more effective and even enjoyable and permits a user to search past commercials in the archive.

Furthermore, no interventions are necessary. An historical log of information and commercials relevant to what the viewer watches—similar to the history file on a personal computer—is automatically created. This information and commercials can be exported or shared with friends or social community. As already mentioned the software running in the processor can sort the stored information by genre, time, channel, etc. and store it for a very long time.

The information stored is not "yellow pages" of everything on the planet but a concise record of what is relevant to the viewing interests of the user. This is in part because of the fact that the channels examined in this particular example are a self-selected sample instituted by the user. It is well known that commercials are most effective if they are relevant to the viewer's interests. In the past, this has been attempted by coupling the nature of the commercial to the programming. For example, beer commercials are put in sports events and women's apparel commercials are placed in dramas that appeal to women. This practice coupled with the present invention, makes the commercials and information captured by the present invention, self-selecting. The user's viewing interests make the captured information naturally relevant.

As previously mentioned, targeting ads to devices with individual electronic addresses is well known. U.S. Pat. Nos. 5,774,170 and 6,002,393 include one of the inventors of the present invention as a named inventor. These patents describe addressability techniques and are incorporated herein by reference. When these techniques are applied, the effectiveness of the present invention is substantially enhanced.

These advantages illustrate the power of autonomous migration of the SIs from the received signal into an organized memory.

Figure 10:
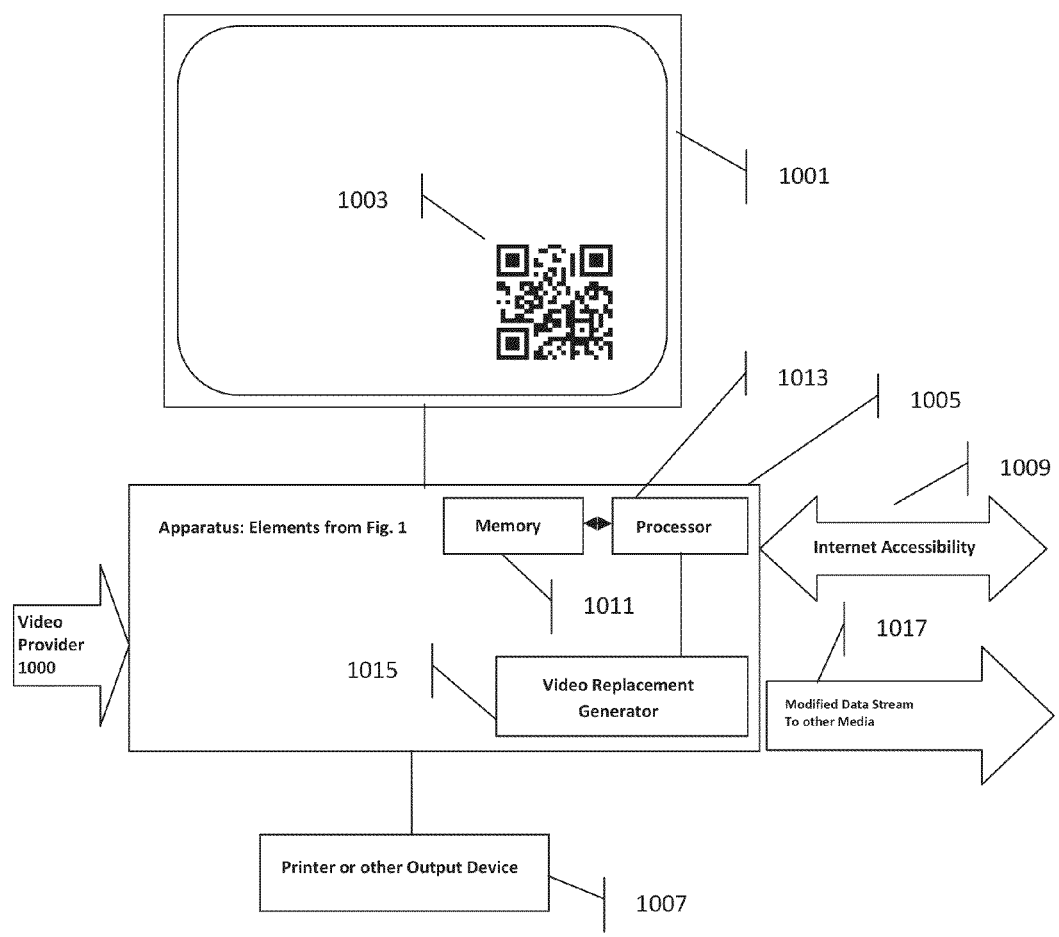
FIG. 10 illustrates the replacement of SIs with more appropriate version or their deletion.

FIG. 10 illustrates a significant improvement of the principles of operation of some embodiments of the present invention enabling SIs to be replaced with more appropriate versions or deleted.

FIG. 10 includes all of the elements of FIG. 8, numbered with the same two least significant digits, plus a Video Replacement Generator, 1015, coupled to the video circuits of the apparatus (not shown in FIG. 10, but present in FIG. 1 as Element 102) and the processor, 1013. The Video Replacement Generator, 1015, is under control of the software in the processor, 1013. If an SI that is more appropriate for the viewer is stored in memory, 1011, it replaces the currently received SI. This takes place if the currently received SI is inappropriate or less appropriate than a previously received and stored SI. If the SI includes a code which classifies its genre, and if the receiver has a list of appropriate genre, a comparison can be made to determine if the SI is suitable for the particular receiver. If the received SI is not suitable, a more suitable SI could be retrieved from memory and utilized instead. For example, if the SI is a commercial for a Pizza Hut store in an adjacent town and a commercial for a local Pizza Hut store has been previously received and stored in memory, that commercial would be more effective for the advertiser and more useful for the viewer and would replace the less appropriate commercial. Another example would be a commercial for a sale that has taken place last month and is no longer in effect. In that case, it would be better to replace the expired commercial with another commercial, a graphic, a video, or even a blank patch. The video that replaces the SI may be the video that was previously in the area subsequently occupied by the SI, covering up that video. This would require that video to be conveyed to the receiving apparatus. That is accomplished with the Video Replacement Generator 1015. The SI may have time information, location information, or other information to assist in appraising its appropriateness for the user of the receiver. The receiver may have identification codes which characterize the types of SI suitable for display at that receiver. Those codes could be downloaded to the receiver or generated locally by responses to a questionnaire or by simply noting over time the types of programming and web sites accessed by the user of the receiver.

As previously described, when the SIs consist of coupons, the coupons can be sorted by the software according to some criteria of interest to the user. The coupons can then be outputted by output device 1007 which may be a printer or hand-held portable device.

Figure 11:
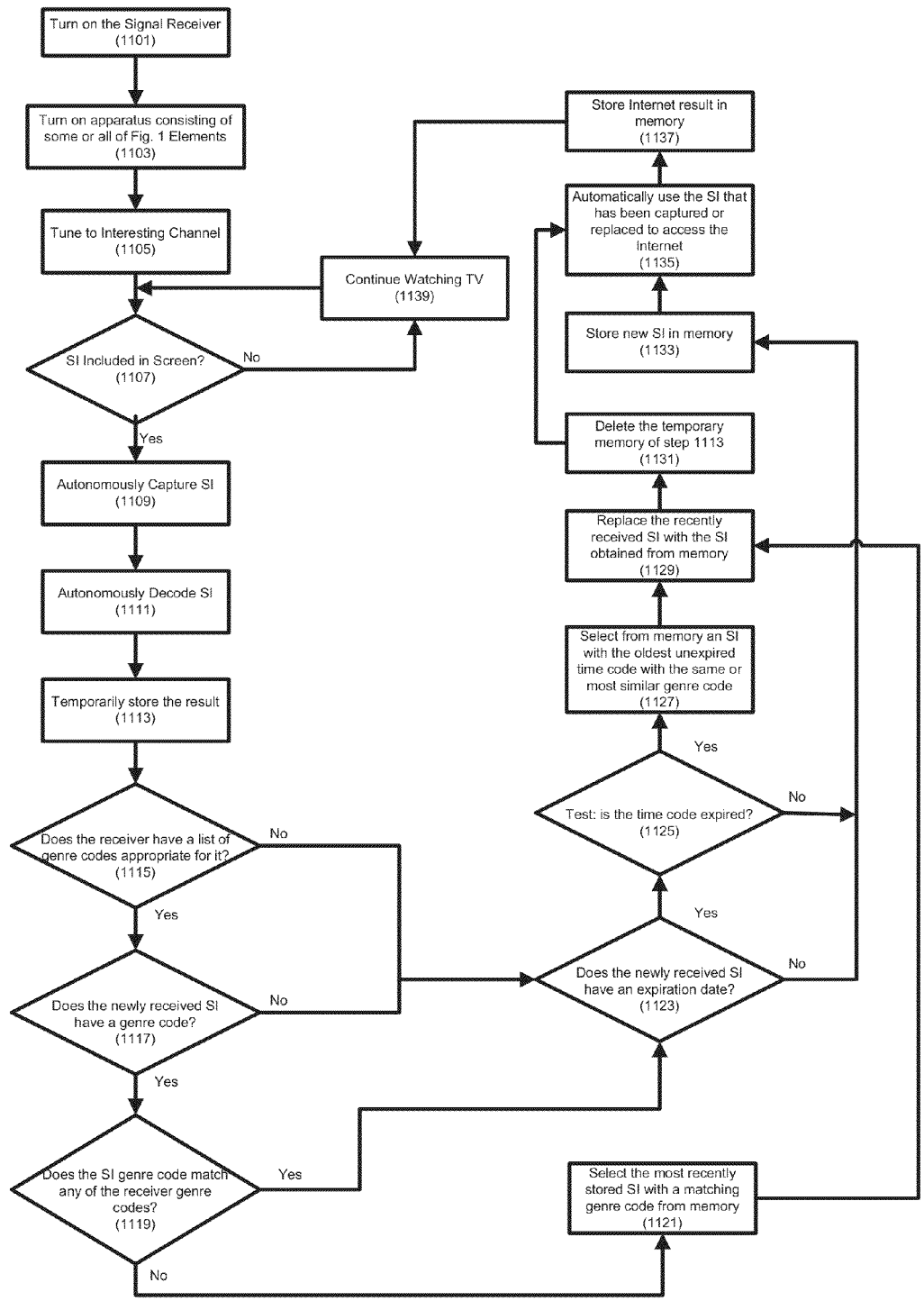
FIG. 11 is a flow chart of methods of operation of the apparatus of FIG. 10.

FIG. 11 is a flow chart for the apparatus of FIG. 10.

Step 1101 Turn on the signal receiver

Step 1103 Turn on the apparatus consisting of some or all of the Elements of FIG. 1

Step 1105 Tune to an interesting channel

Step 1107 Is SI included in the Screen?

If "yes" proceed to Step 1109, If "No" proceed to Step 1139

Step 1109 Autonomously capture SI code

Step 1111 Autonomously decode SI

Step 1113 Temporarily store the result

Step 1115 Does the receiver have a list of genre codes appropriate for it?

If "Yes" proceed to Step 1117, if "No", proceed to Step 1123

Step 1117 Does the newly received SI have a genre code

If "Yes" proceed to Step 1119, if "No" proceed to Step 1123

Step 1119 Does the SI genre code match any of the receiver genre codes?

If "No", proceed to Step 1121, if "Yes" proceed to Step 1123

Step 1121 Select the most recently stored SI with a matching genre code from memory and proceed to Step 1129

Step 1123 Does the newly received SI have an expiration date?

If "No" proceed to Step 3 if "Yes" proceed to Step 1125

Step 1125 Test for time code expiration

If expired, proceed to Step 1127, if not expired, proceed to Step 1133

Step 1127 If the time code is expired, select from memory an SI with the oldest unexpired Time Code with the same or most similar Genre code Step 1129 Replace the recently received SI with the SI obtained from memory Step 1131 Delete the temporary memory of Step 1113, Proceed to Step 1135

Step 1133 Store new SI in memory

Step 1135 Automatically use the SI code that has been captured or replaced to access the Internet Step 1137 Store Internet Result in memory Step 1139 Continue to watch TV and return to Step 1107

One of ordinary skill in the art would be able to expand the above steps to include other attributes, such as GPS location, etc.

The above illustrations considered applying embodiments of the invention to a local receiver built into a cable, satellite, telephone company video subscriber unit (set top box) or built into a television receiver or other user device (or user unit) which can receive television or Internet Protocol (IP) signals.

FIG. 1 also includes the situation wherein certain embodiments of the invention can be practiced at a signal distribution point, such as a cable headend, a cable system hub, a cable system node, or similar intermediate distribution point. One of ordinary skill in these arts will understand that the apparatus described above and the method steps described above apply equally to these situations and will recognize that application in the FIG. 1 Elements, 105, 107, and 108 (a . . . n) and their associated interconnections with other Elements. In that application, the apparatus of FIG. 10 and the steps of FIG. 11 replace the SI received from the Video Provider with a more appropriate SI and convey the modified data stream to other viewers, for example the Media access points on the right of FIG. 1 shown as 1017 in FIG. 10.

Figure 12:
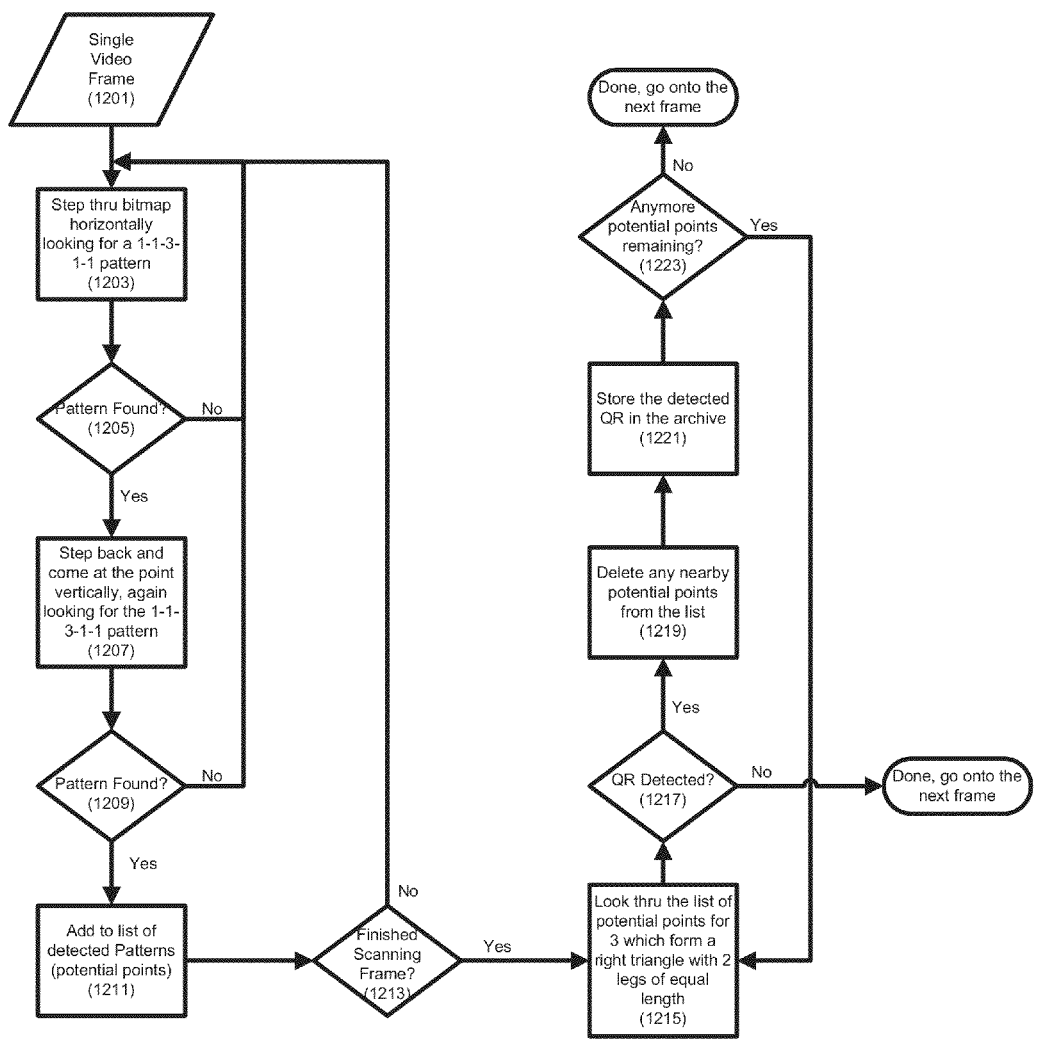
FIG. 12 is a flow chart of a process by which a two dimensional SI can be detected in a video stream.

FIG. 12 illustrates a potential process by which a two dimensional SI—particularly a quick response (QR) code—may be detected in a video stream. Element 1201 is derived from the complex stream after demodulation, decoding, etc and is assumed to be a bitmap of a single frame in grayscale. This bitmap is stored in a structure in memory. The structure contains information about the image—height, width, and format of the color space (RGB, HSV, etc.)—as well as an array of pixels beginning at the top left corner of the frame and ending at the bottom right. It should be appreciated that given this structure, a process will be able to navigate to any part of the image arbitrarily. To move horizontally to the right, a process increments the index into the array of pixels; conversely to move left, it would decrement the index. To move vertically down the frame, the process would add the width of the image to the current index or to move vertically up, the width would be subtracted. Diagonal movements can be performed using a combination the vertical and horizontal process. Functions and macros may also be used to simplify this arithmetic into an (x,y) coordinate.

In the following discussion, an SI element is defined to be the smallest chunk of an SI that represents a single bit of its encoded data. Each element may be represented by one or more pixels, depending on the size of the SI with respect to the full frame. It should however be appreciated that the lower limit of one pixel per element requires the SI to be perfectly planar to the image and each element perfectly aligned to the pixel borders, which implies digital insertion. If the SI is not perfectly planar to the image or the elements are not aligned to the pixel borders (which is likely to happen if the SI was not digitally inserted), more than 1 pixel per element will be necessary to get enough resolution to pick up the finder pattern and decode the SI.

The format of the QR (and many other SIs) uses a completely white element to represent one binary state, and a completely black element to represent the other. To make detection easier and to reduce the amount of data that must be handled, each pixel of the bitmap is first compared against a 'threshold', to get from the grayscale pixel format to true binary pixels (either white or black) that will be used to drive the detection process later on (see FIG. 13).

The detection process begins in element 1203 by stepping horizontally across each line of pixels, similar to an NTSC scan line. Each pixel is examined and a threshold is used to determine if it be white or black. This drives a state machine that 'watches' for the 1-1-3-1-1 ratio (or other similarly predicated locator) seen in a QR finder pattern. As a line is scanned, a white to black transition is treated as a 'sync pulse' and successive pixels are counted until a black to white transition. If it happens to be on a finder pattern (or not), this will set the module size that will be used in the rest of the pattern detection. The number of pixels in each module must now match the remaining 1 1 3 1 1 pattern within a certain range or it is determined to be a false positive, and the state machine goes back to looking for the next sync pulse. See FIG. 14.

Element 1205 can be considered to be the output of this state machine. When a pattern is detected, Element 1207 will perform a 'cross-check' using a similar state machine, but this time going in a vertical direction in the area local to where element 1205 was successful. The output of this second state machine may be considered to be Element 1209. If successful, it is determined to be a finder pattern whose center is then calculated and added to a list of detected patterns (1211). Element 1213 allows this process to continue until the entire frame has been scanned. Meanwhile, 1211 will continue adding detected points to the list. Note that in FIG. 15, not every line needs to be scanned as long as the maximum scan spacing is not exceeded between each scan line. The upper limit of this scan spacing will be determined by the minimum size of the SI that we want to be able to detect—I.e., if the minimum SI expected to appear works out to have an element size 5 pixels high, the scan spacing could be set to hit one line out of every 5.

The list of potential finder patterns, populated by 1211, is now correlated into one or more QRs using the following process. Element 1215 looks at the geometry between the patterns, searching for three that create a right triangle with legs of equal length. Element 1217 may be considered to be the output of this search.

Some false positives should be assumed, as well as multiple points coming from the same finder pattern i.e., if the scanner hits it two or three times as it progresses down the frame, there will potentially be that many points over the same finder pattern. This is the purpose of element 1219. At this point, the 3 finder patterns may be examined to determine the orientation of the QR. Its orientation, if not planar to the frame, may be corrected by geometrically twisting it in one direction or the other before storing it in its own separate bitmap in Element 1221. Element 1223 then determines if more potential points remain for correlation into more QRs and either goes back to 1215 to check for more QRs until the list is empty, or ends the detection process for the current frame. Once the detection process for the frame is complete, the SIs stored (in the form of bitmaps) by 1221 may be passed onto element 110 of FIG. 1 either by a serial data stream or, if FIG. 1 is also implemented in software, by simply passing the bitmap structure(s) onto the appropriate method.

Figure 13:
FIG. 13 is an illustration of a progressive conversion of an SI into a Binary Bitmap.

FIG. 13 illustrates an example conversion of a single decoded frame into a 'binary' bitmap image that can be used for the detection process outlined in the description of FIG. 12.

Figure 14:
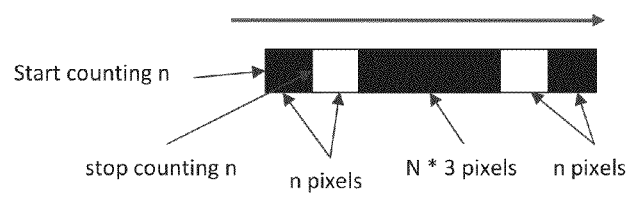
FIG. 14 illustrates horizontal scanning for initial detection of a QR finder pattern.

FIG. 14 illustrates the horizontal scanning process which is used for the initial detection of a QR finder pattern. It should be appreciated that the same ratios (1 1 3 1 1) will be seen even if the finder patter is not square to the scan line.

Figure 15:
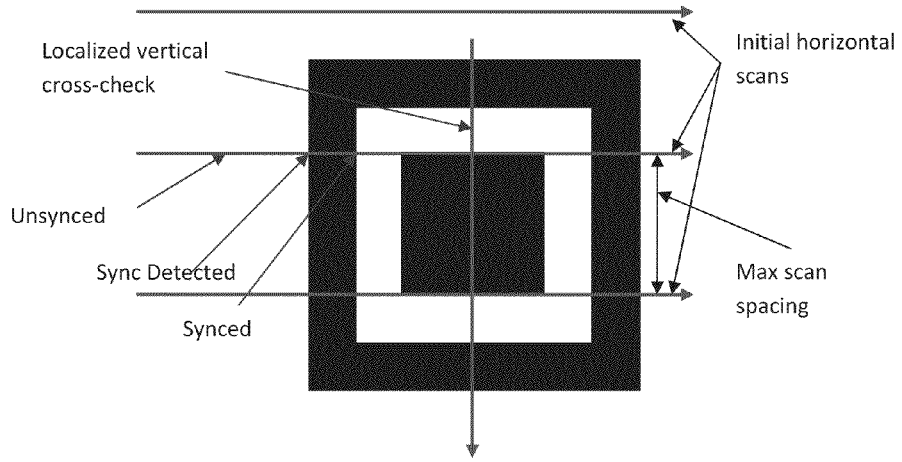
FIG. 15 illustrates the scanning process of the flow chart of FIG. 12.

FIG. 15 illustrates a more complete view of the scanning process to better describe the sequence of operation described in FIG. 12.

Figure 16:
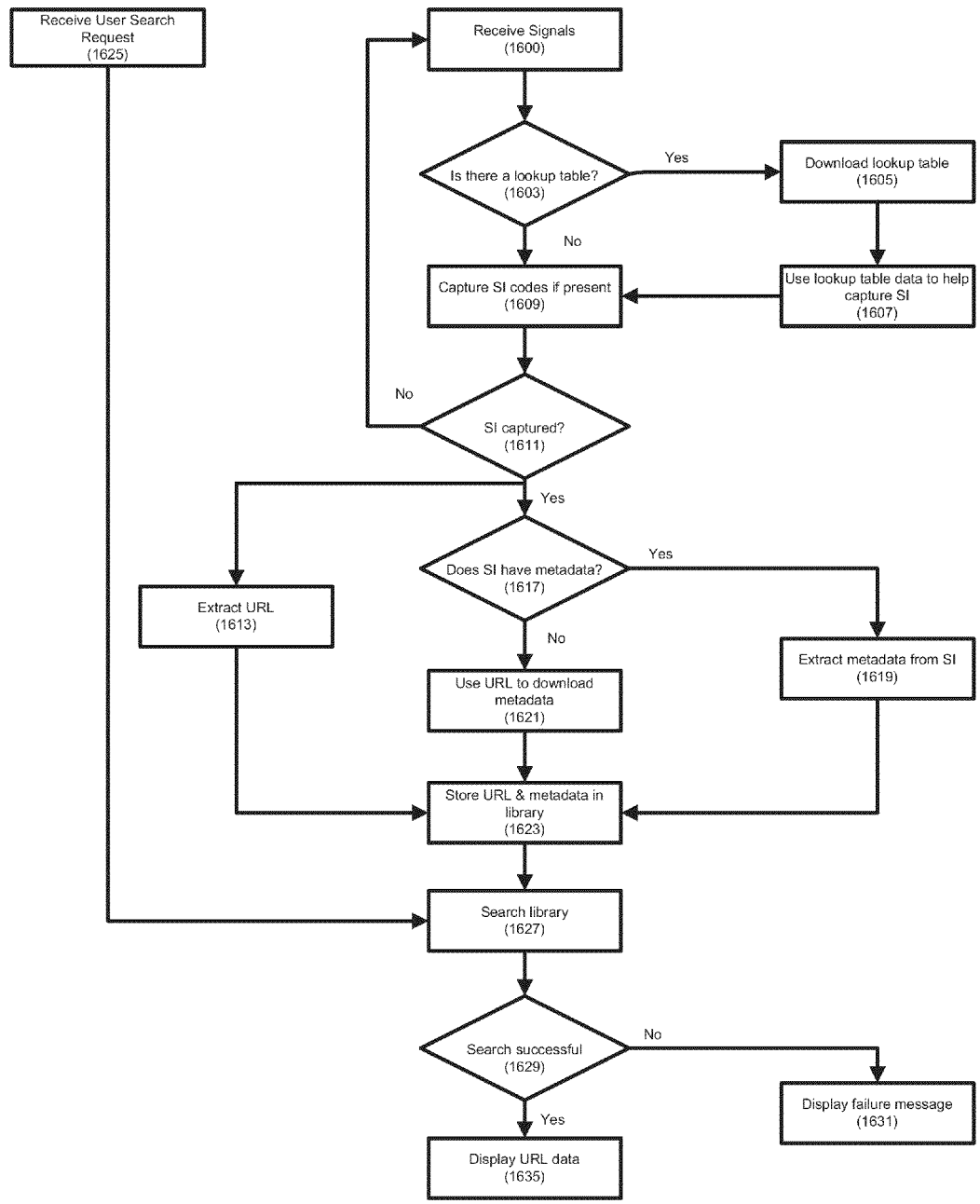
FIG. 16 is a flow chart of a method of capturing an SI so that it can be the subject of a subsequent search.
Figure 17:
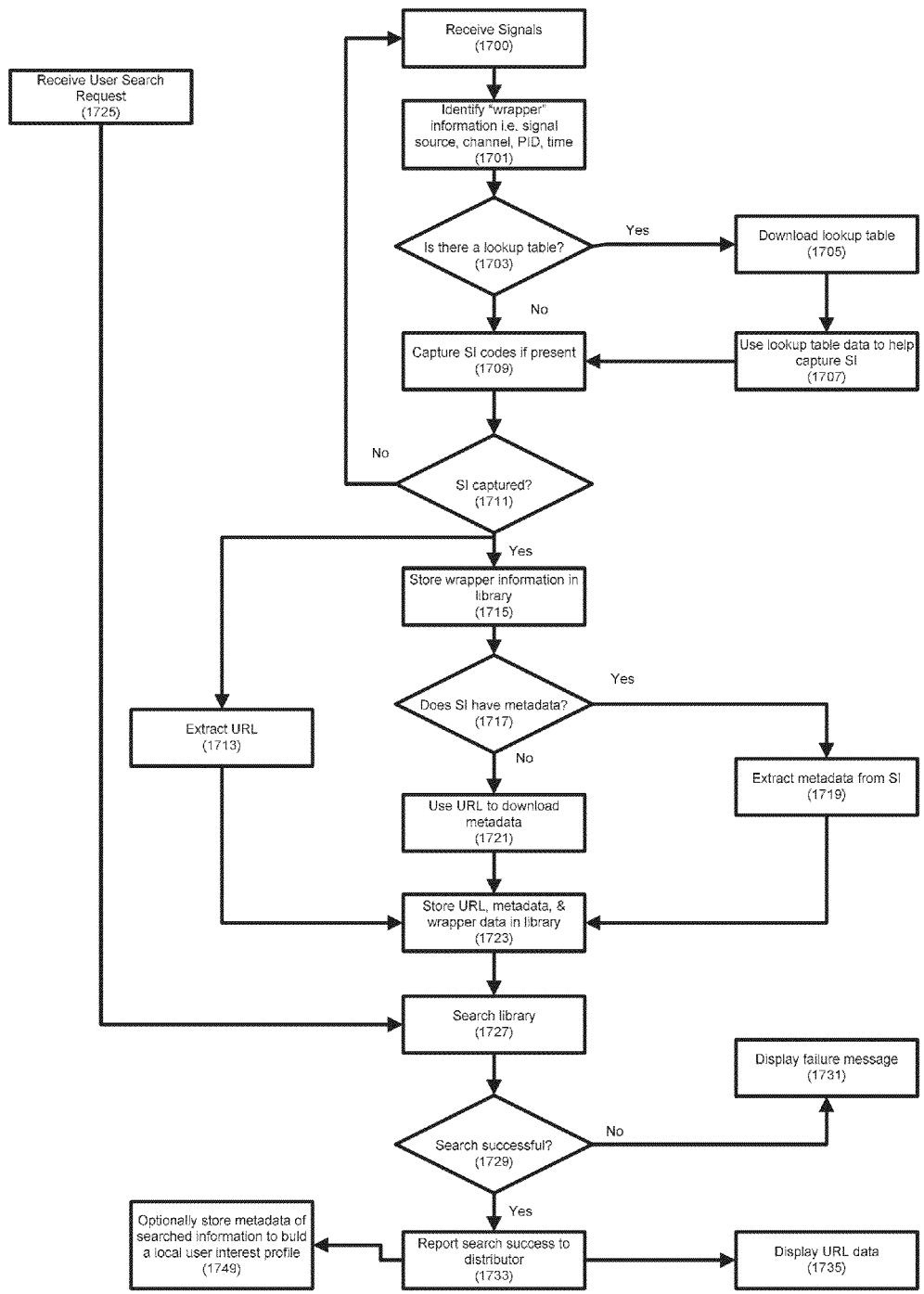
FIG. 17 adds wrapper information and enables reporting of a successful search and the optional storage of information for building a Local User Interest Profile.

FIG. 16 is a flow chart of a method of capturing an SI so that it can be the subject of a subsequent search
    Step 1600 Receive Signals
    Step 1603 Is there a Lookup Table? The Lookup Table contains downloaded information which describes the format of the SI of interest and provides data useful in locating and decoding the SI
       If "yes" proceed to step 1605
       If "no" proceed to step 1609
    Step 1605 Download Lookup Table
    Step 1607 Use Lookup Table data to help Capture SI
    Step 1609 Capture SI codes if present
    Step 1611 SI Captured?
       If "yes" proceed to step 1617
       If "no" proceed to step 1600
    Step 1613 Extract URL
    Step 1617 Does SI have Metadata? Metadata includes, but is not limited to, data about the SI such as the subject matter(s) described by the SI, the source of the information, the date created, the "expiration date" beyond which the SI is no longer valid,
       If "yes" proceed to step 1619
       If "no" proceed to step 1621
    Step 1619 Extract Metadata from SI
    Step 1621 Use URL to download Metadata
    Step 1623 Store URL, & Metadata data in Library
    Step 1625 Receive User Search Request
    Step 1627 Search Library
    Step 1629 Search successful?
       If "yes" proceed to step 1635
       If "no" proceed to step 1631
    Step 1631 Display Failure Message
    Step 1635 Display URL data FIG. 17 adds wrapper information and enables reporting of a successful search and the optional storage of information for building a Local User Interest Profile
    Step 1700 Receive Signals
    Step 1701 Identify "wrapper" information. Wrapper information includes but is not limited to signal source: channel, Program Identification bits, PID, time received, GPS coordinates if available, user operating the device, etc.
    Step 1703 Is there a Lookup Table?
       If "yes" proceed to step 1705
       If "no" proceed to step 1709
    Step 1705 Download Lookup Table
    Step 1707 Use Lookup Table data to help Capture SI
    Step 1709 Capture SI codes if present
    Step 1711 SI Captured?
       If "yes" proceed to steps 1715 and 1713
       If "no" proceed to step 1700

Step 1713 Extract URL
Step 1715 Store wrapper information in library
Step 1717 Does SI have Metadata?
   If "yes" proceed to step 1719
   If "no" proceed to step 1721
Step 1719 Extract Metadata from SI
Step 1721 Use URL to download Metadata
Step 1723 Store URL, Metadata & Wrapper data in Library
Step 1725 Receive User Search Request
Step 1727 Search Library
Step 1729 Search successful?
   If "yes" proceed to step 1733
   If "no" proceed to step 1731
Step 1731 Display Failure Message
1735 Display URL data
Step 1733 Report Search Success to Distributor of the SI for purposes including, but not limited to, billing for services, monitoring popularity of SIs, other financial and/or marketing purposes
Step 1735 Display URL data
Step 1749 Optionally Store Metadata of searched information to build a Local User Interest Profile
   A User Interest Profile is a list of characteristics that enable the selection of appropriate SIs for said user. For example, the Metadata can be compared to the User Interest Profile, preferably using the techniques of "Fuzzy Logic" to decide which SIs are most appropriate for the individual user. The Local User Interest Profile is created within the user's hardware and/or software and thus can better protect privacy.

Figure 18:
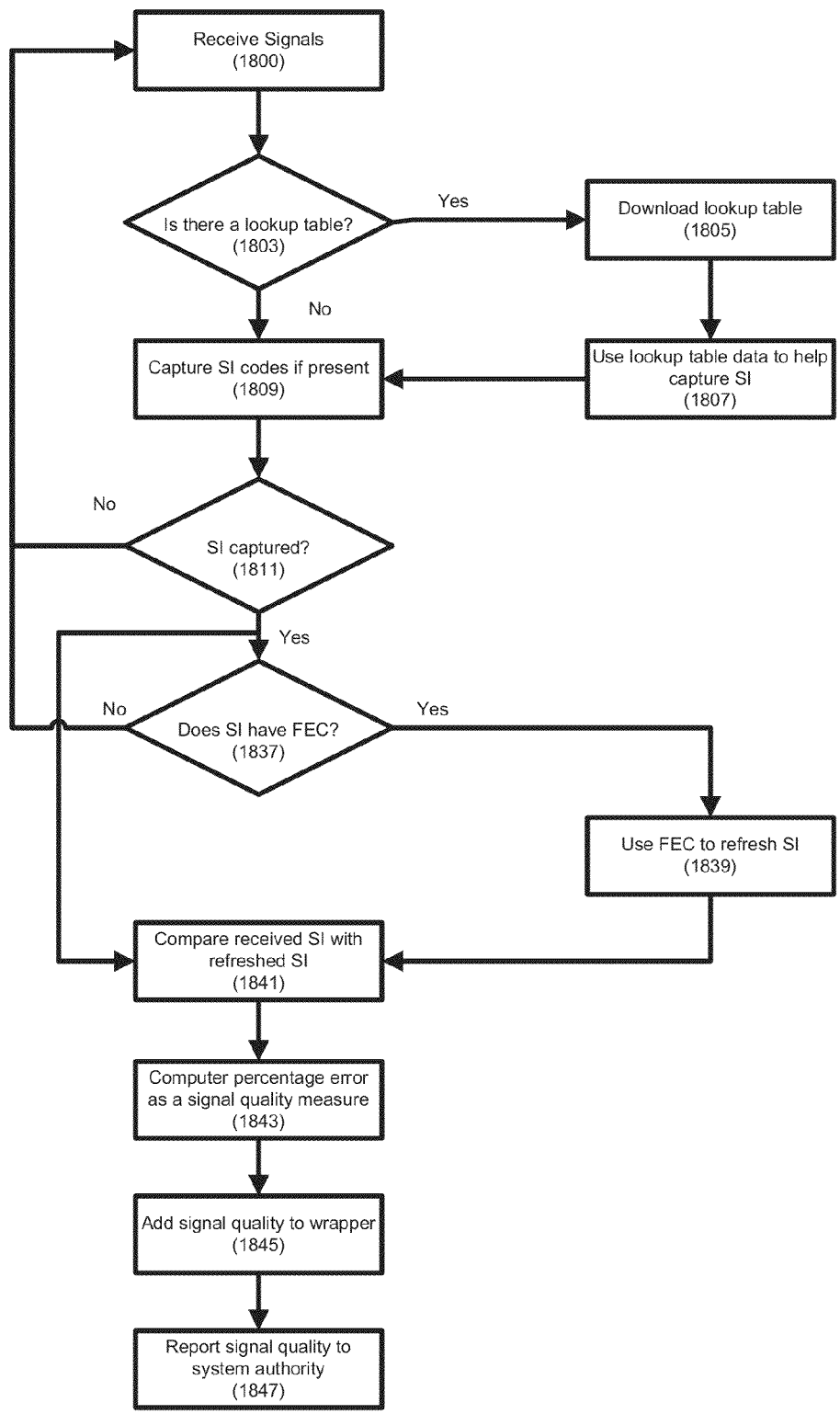
FIG. 18 is a flow chart of a method of using the FEC to estimate signal quality.

FIG. 18 is a flow chart of a method of using the SI's Forward Error Correction (FEC) code to estimate signal quality of the transmission path
Step 1800 Receive Signals
Step 1803 Is there a Lookup Table?
   If "yes" proceed to step 1805
   If "no" proceed to step 1809
Step 1805 Download Lookup Table
Step 1807 Use Lookup Table data to help Capture SI
Step 1809 Capture SI codes if present
Step 1811 SI Captured?
   If "yes" proceed to step 1837 and 1841
   If "no" proceed to step 1800
Step 1837 Does SI have FEC?
   If "yes" proceed to step 1839
   If "no" proceed to step 1800
Step 1839 Use FEC to Refresh SI, removing as many errors as possible
Step 1841 Compare Received SI with refreshed SI
Step 1843 Compute Percentage Error as a figure of goodness, or utilize any other signal quality measure
Step 1845 Add signal quality measure to Wrapper
Step 1847 Report signal Quality to System Authority for maintenance, billing, or other purposes FIG. 19 is a flow chart of a method of passing, blanking, or replacing an SI based on a User Interest Profile
1900 Receive Signals
1901 Identify "wrapper" information, i.e. signal source: channel, PID, time
1903 Is there a Lookup Table?
   If "yes" proceed to step 1905
   If "no" proceed to step 1909
1905 Download Lookup Table
1907 Use Lookup Table data to help Capture SI
1909 Capture SI codes if present
1911 SI Captured?
   If "yes" proceed to step 1913 and 1915
   If "no" proceed to step 1900
1913 Extract URL
1915 Store wrapper information in library
1917 Does SI have Metadata?
   If "yes" proceed to step 1919
   If "no" proceed to step 1921
1919 Extract Metadata from SI
1921 Use URL to download Metadata
1923 Store URL, Metadata & Wrapper data in Library
1951 Build User Interest Profile. One of ordinary skill in these arts will be aware of a wide variety of methods of building a User Interest Profile. An elementary method, for example, is to simply tally the number of times a term in the Metadata is employed by the user in a search. The terms with the highest tallies will be an indication of the user's interest.
1953 Has a User Interest Profile been downloaded? A downloaded User Interest Profile can be obtained from companies that do research and create such lists for marketing purposes such as direct mail advertising
   If "yes" proceed to step 1957
   If "no" proceed to step 1955
1955 Store User Interest in Library
1957 Store Downloaded User Interest Profile in Library
1959 Optionally Download User Interest Profile
1961 Does Metadata indicate a premium SI? A premium SI is one intended for more limited use rather than inclusion in all signals. An example would be highly targeted advertising. For example, if the advertiser knows from other sources that the user has a dog but not a cat, the user will not be bothered by advertisements pertaining to cats. The user may find advertisements pertaining to dogs both useful and interesting and the advertiser's money is better spent.
   If "yes" proceed to step 1965
   If "no" proceed to step 1963
1963 Pass SI unchanged & Optionally Report
1965 Does Metadata Include "Use-By Date"? For example, if the SI pertains to a sale, the sale is likely to be offered for a limited time. Acting upon the SI after the expiration date will likely cause frustration and bad will towards the provider of the SI.
   If "yes" proceed to step 1967
   If "no" proceed to step 1977
1967 Is "Use-By Date" expired?
   If "yes" proceed to step 1969
   If "no" proceed to step 1977
1969 Delete expired SI from the library
1971 Is there appropriate but unexpired SI in Library?
   If "yes" proceed to step 1975
   If "no" proceed to step 1973
1973 Blank SI
1975 Replace SI with more appropriate SI & Report
1977 Does Metadata include category code? The category code is a more specific piece of Metadata intended for matching with the User Interest Profile. Matching can be accomplished without a category code, but the category code increases the likelihood of a better match to the user's interests.
   If "yes" proceed to step 1981
   If "no" proceed to step 1979
1979 Pass SI unchanged and Report
1981 Does category code match User Interest Profile?
   If "yes" proceed to step 1979
   If "no" proceed to step 1983

1983 Does Library have a more appropriate Category code?

If "yes" proceed to step 1987

If "no" proceed to step 1985

1985 Blank SI

1987 Replace SI & Report

Other Embodiments

Other embodiments of the present invention will be understood by those of ordinary skill in these arts.

Three types of providers of video services use set top boxes or other subassemblies or devices which are externally added to or internally built-into receivers for the purpose of controlling and conditioning their signals for display on the consumers' television sets and other display devices. These three, in order of current market share, are cable television operators (such as Comcast or Time Warner Cable), direct broadcast satellite services (such as DirecTV or Dish Networks), and telephone company video services (such as AT&T's U-verse® and Verizon's FiOS®). A fourth source of video service is beginning to be deployed. Video in this mode is received directly by computers, tablet computers (also called "pads"), and specially equipped television receivers using Ethernet or radio signals (such as Wi-Fi, Wi-Max, and other techniques) to connect to the Internet. Current examples include Netflix, Amazon and Hulu. Broadcasters are also allowed to control access to portions of their broadcast signals under certain circumstances.

Portable devices often include GPS circuits or the ability to triangulate cell phone towers or other means to identifying location. Location information can be combined with the information of this invention to make the result more relevant and useful to the user.

Certain embodiments of the present invention can be partially or completely implemented in hardware or software in these devices, either by being built-in prior to being put into use or having software subsequently downloaded.

Modern digital set top boxes, smart phones, and hand-held devices have down-loadable software applications to allow upgrades of previously installed software, correction of problems uncovered in normal usage, and the addition of new applications. Downloadability seeks to avoid the need to visit the consumer's premises to physically retrieve and replace his equipment. The more modern set top boxes have substantial computing power and memory while earlier units are comparatively inferior in both of these respects. Therefore any application should be designed with basic capabilities for older set top box designs with limited computational and memory assets while having optional upgraded features to take advantage of the increased computational power and memory of newer set top boxes.

Any application can be implemented to run either completely in the set top or other device or to run mostly in servers at some other remote location in communication with relatively limited software running in the set top box or other device.

The advantage of signal processing in the remote server is the massive amount of memory and computing power that can be made available to the task when its cost can be amortized over many users. On the other hand, the advantage of signal processing in the set top box is more easily protected privacy and avoiding the propagation time delay experienced when the processing is done at a remote location.

According to certain embodiments of the present invention, one goal is to locate and identify SIs embedded in the video. Specifically, two dimensional SIs are of interest because they can convey much more information than one dimensional SIs. Many SI systems have been developed for use in cell phones that include built-in cameras. Cell phones have limited computational and memory assets; consequently, the SI recognition software must be compact and efficient. In some applications, limited software in the device captures some information and transfers it upstream to servers and processors which do the "heavy lifting" and then relay the result to the device. An example of this is the Dragon voice to text application used with iPhones, iPads, and iPods. See http://www.nuancemobilelife.com/apps/ and http://itune.apple.com/us/app/dragon-dictation/id341446764?mt=8.

The Quick Response, QR, two dimensional SI is used here as an example, but the present invention is not limited to the QR SI.

According to one embodiment of the present invention, MPEG video compression is used. The MPEG video compression technology includes I-frames which are complete still pictures used to limit the propagation and accumulation of errors in estimates made in the video compression process. When MPEG I-frames occur, they are captured in a separate "scratch pad" memory and presented to the one or more high speed processors. Since these I-frames are just still pictures, simply using the same software techniques employed in cell phones to decode QR codes will do the SI decoding job here as well, but not the capturing task. This software is caused to scan its section of the image and decode the SI it finds. Alternatively, new software can be written to perform this task, or the existing software optimized. One of ordinary skill in these arts will understand that there are many pattern recognition techniques available. Any one of them could be used to practice the current invention. This is not the case with the capturing task.

In the case where most of the processing is done in servers located at some other location, one or more high speed signal processors can be applied to the task. When more than one high speed processor is used, they can be operated in parallel, each assigned to a segment of the image or similar portion of the task. Of course, as time goes on, Moore's Law enables more and more capability (speed, processing power, and memory) to be included in the integrated circuits used to implement the set top box or other device and therefore more of the functionality installed in the remote location can be brought to the set top box or other device.

Once the SI or similar encoded information is detected and decoded, its instructions can be acted upon in the set top box or other device. Alternatively, the instructions can be acted upon at the remote location and the results communicated to the set top box or other device.

When video providers carry programming from third parties, they are usually allowed to sell advertising in a fraction of the number of time slots used for ads. These timeslots are called "avails" because they are made available to the video provider as a form of compensation for carriage of the programming. Since there are very few potential customers who do not now subscribe to a multichannel video service, new subscriptions are not a promising route to increased revenues for Video Providers. Continual rate increases are limited by the political consequences. Thus new sources of revenue are needed. Currently, one of the most important prospects of new revenue is enhanced advertising. SIs and similar encoded information are strong candidates for enhancing advertising. A further benefit enables cost-effective repurposing of advertising material intended for web pages and other SI enabled media to be included in video streams, without the added cost of re-editing. SIs in video will no longer be an irritant because they can be recovered and benefit the consumer.

Currently, the Dish Network DBS service is causing controversy by offering hardware, software and a service which skips advertisements on certain channels when the programming is watched some time later. Dish Networks charges for this service. The channel originators are furious and legal action has begun. If SIs were included in the advertisements, the methods and apparatus of some of the embodiments of the present invention could be used to ameliorate the dispute. Subscribers would have access to the information in the SIs, but at times and circumstances convenient to them. Advertisers would be able to reach subscribers under conditions wherein they are more likely to be receptive to the message. The consumer does not dislike commercials so much as the invasive way they are presented.

Under some circumstances, it is desirable to be able to change the SI, to substitute a more appropriate SI. For example, if the SI is for a coupon for a discount for a pizza, it would be helpful to be able to change the SI to match the viewer's location to the nearest pizza place (as mentioned above). Another example features matching the SI ad to a characteristic of the individual viewer. For example, cable companies flood subscribers with ads for introductory offers for their "triple play" combination of Voice, Video and Data. Substantial discounts are offered for the first year. Subscribers who are already "triple play" customers are not eligible for the discount. These advertisements cause irritation and frustration. Cable companies would do better to not send that advertisement to current full subscribers. The cable companies know who the full subscribers are. More appropriate targeting would be more efficient for the advertiser and less irritating for the viewer.

Targeting ads to devices with individual electronic addresses is well known. U.S. Pat. Nos. 5,774,170 and 6,002,393, which are incorporated herein by this reference, include one of the inventors of the present invention as a named inventor. These patents describe addressability techniques.

Of course, set top boxes aren't the only way of implementing these functions. Consumer electronics manufactures increasingly include Internet Protocol, IP, capability in their products along with computational and memory assets. Many of these devices also include the ability to download software. These downloadable software programs have become known as "apps", short for "applications". Television sets, home theater systems, laptops, tablets, smart-phones, personal digital assistants, DVD payers, and other devices are all becoming IP connected and capable of downloaded apps.

When the information in a SI is captured either by the set top box, the consumer electronics device, or the remote server and downloaded to the receiver, the information is made available at the viewer's location. If the information is a description of a coupon, that information can be conveyed to a device to allow the viewer to utilize the coupon. At least two methods are envisioned. In one method, the coupon is conveyed by Wi-Fi, Bluetooth, ZigBee or some other signaling method to a personal computer for storage and printing of paper coupons which then can be used in the normal method when shopping. The use of the personal computer is optional. Some printers have a feature which enables the coupon to be directed to the printer without going thru the computer. Another method is to convey the image or electronic symbol of the coupon to a smart-phone or privilege fob—such as an electronic credit card—where it can be stored until the viewer visits the retailer. At the retailer, the image of the coupon or other format, perhaps including a SI or even limited to just an SI, appears on the screen of the smart-phone or is presented electronically and is read by a scanner or receiving device at the retailer. Alternatively and perhaps more conveniently, the SI data stored on the smart-phone could be sent to a cashier's station by WI-FI, Bluetooth, or similar wireless streaming for subsequent check out activity. As smart-phones become used as payment devices in retail situations, just storing the information concerning the coupon will be all that's necessary. The coupon can be automatically used in the check-out process. As yet one more alternative, the coupon can be conveyed to the retailer and stored on a server by the retailer electronically. When the purchase is made, the coupon is automatically applied.

Additional Opportunities

An SI system could be constructed to broadcast an inventory of captured SIs for use by smart phones etc. This might take place as a WI-FI hotspot or Bluetooth link. Many people who are not users of smart phones never-the-less now have computers and Internet access. Older users, less interested in smart phone features, still use Internet services. Additional on-line processing of the previously captured SIs can be applied to produce a page or material for each icon captured. This information stream could be sent, as an example, via an IP address to a local server for display on the home PC. A service of the collection and display of coupons is likely to be of interest to many users. This is especially true of seniors with limited computer interest or skills, but in need of the savings possible with coupon usage. Such a service could be implemented within a set top box or by bridging the video stream to the viewer's TV display. If the service were interposed within a set-top box when the users display were turned off or through the use of second tuner, channels could be scanned for the discovery and collection of SIs and the assembly of coupon screens. This scanning need not be ad hoc, because the viewing habits and the channels most frequently used are already known, emphasis of these channels can focus the collection during 'off' periods.

A business opportunity is enabled in fast-paced activities like sporting events. SIs are added to the real-time program stream which relate to players of immediate interest. This might include statistics, 'color' stories, etc. This is similar to practices often employed by broadcasters using a "color man" who provides relevant details and personal-interest information to fill the time between activities on the athletic field. Also information about recent performance, the venue or a host of germane topics which when processed by the system could be ported via WI-FI as a "deck of cards" which are scrollable on a smart-phone. The user has this second screen at hand and looks thru these to enhance his or her viewing experience. An occasional screen for a beer might be included to generate revenue or a user subscribing to an enhanced experience that would otherwise skip over the brewski screens.

Secure Predetermined Graphical Images

The process of encryption and decryption of text through the use of Public and Secret Codes is well understood and been in use for quite some time. This is but a single way of generating a secure transmission pathway.

QR Images are not constrained to standard text, they can also be used to carry ciphertext. Ciphertext can be generated by the conversion of plain text into ciphertext through the use of an algorithm which can be conventional. Ciphertext is otherwise unintelligible. Conversely the ciphertext can be restored to plain text by the use of a further algorithm to reverse the process. The processes to accomplish this goal are boundless and those with ordinary skill in the art can apply known techniques to accomplish this desired result. Restoration algorithms, additional ciphertext or keys can be placed in additional Predetermined Graphical Images and compounded to accomplish the desired result of reducing ciphertext to plan text.

The above described embodiments of the invention are intended to be illustrative only. Numerous alternative embodiments may be devised by those skilled in the art without departing from the scope of the following claims.

What is claimed is:

1. A system for managing information relating to scannable icon data, the scannable icon data included in analog video signals or digital video signals, the scannable icon data generated by and received from a source provider, the system comprising:
   a. a data stream processor configured to receive and process one or more of the analog video signals or digital video signals and, in the case of analog video signals, to convert portions of the analog video signals to digital format and to provide a first digital video data stream corresponding to at least some converted portions of the analog video signals;
   b. a video decoder coupled to the data stream processor configured to decode digital video signals received from the data stream processor in order to provide a second digital video data stream;
   c. a graphical image detector coupled to the data stream processor and to the video decoder and configured to receive the first digital video data stream from the data stream processor or the second digital video data stream from the video decoder, and to automatically and autonomously detect, in the first digital video data stream or second digital video data stream, scannable icon data corresponding to a scannable icon, the scannable icon data configured for generation of a scannable icon for presentation on a video display, the scannable icon including at least one built-in recognition-aid precursor, the scannable icon capable of being scanned from the video display by a mobile device to produce at least an address configured to allow the mobile device automatically to access content on the internet; the graphical image detector configured to detect the scannable icon data by comparing pixels in a bitmap in recognition-aid precursor data in the scannable icon data, the recognition-aid precursor data corresponding to the at least one built-in recognition-aid precursor in scannable icon;
   d. a graphical image decoder configured to receive scannable icon data from the graphical image detector and to decode the scannable icon data to decoded data that includes at least (1) an address configured to allow access to content on the internet; and (2) collateral information that includes at least one of channel source, unique identifier and timestamp; and
   e. a first library configured to receive, from the graphical image decoder, the decoded data and to store the decoded data, the first library also configured to receive ancillary information, the ancillary information relevant to the analog or digital video signal that includes the scannable icon data.

2. A system according to claim 1 wherein the video decoder is configured to demodulate portions of the analog video signals from the data stream processor.

3. A system according to claim 1 wherein the ancillary information includes information relating to the analog video signal or digital video signal in which the scannable icon data is included; the time that the scannable icon data occurred in the signal; and a program identification relating to a program within which the scannable icon data occurred.

4. A system according to claim 1 wherein the lookup table is configured to receive from a multiple channel video provider information relating to detection parameters for one or more different types of graphical images that include coded data sequences.

5. A system according to claim 1 wherein the scannable icon is a two dimensional coded image.

6. A system according to claim 1 wherein the scannable icon is a one dimensional coded image.

7. A system according to claim 1 wherein the scannable icon is a quick response code.

8. A system according to claim 1 wherein the graphical image detector is configured to conduct error correction on a coded data sequence included in the scannable icon data, and to provide information related to the error correction in order to indicate figure of goodness for a transmission path of the scannable icon data.

9. A system according to claim 1 wherein the system is included in a subscriber unit and the data stream processor is configured to receive and process one or more analog or digital video signals from a video provider.

10. A system according to claim 1 wherein the system is included in a processing facility of a video provider.

11. A system according to claim 1 wherein the system includes a video replacement generator that is configured to receive signals from the video decoder and information contained in the first library, and to provide signals that contain a replacement scannable icon data.

12. A system according to claim 1 wherein the system includes a video replacement generator that is configured to receive signals from the video decoder and to provide signals that do not contain scannable icon data.

13. A system according to claim 1 wherein the system includes a video replacement generator that is configured to receive signals from the video decoder and to provide signals that contain indicia to indicate that scannable icon data has been provided to the first library.

14. A system according to claim 1 wherein the system is configured to provide a video data stream that replicates at least some signals provided by a video provider.

15. A system according to claim 1 wherein the system is configured to provide at least some of the scannable icon data via wired or wireless connection.

16. A system according to claim 1 wherein the system is included in a user unit and is configured to provide coupon information in the scannable icon data for output to a printer, smartphone, wireless device, or privilege fob.

17. A system according to claim 1 wherein the system is included in a user unit and the first library is configured to provide at least some of the scannable icon data and ancillary information relating to the scannable icon data to a user device for searching and use by a user.

18. A system for managing information relating to scannable icon data, the scannable icon data included in analog video signals or digital video signals, the scannable icon data generated by and received from a source provider, the system comprising:
   a. a data stream processor configured to receive and process one or more of the analog video signals or digital video signals and, in the case of analog video signals, to convert portions of the analog video signals to digital format and to provide a first digital video data stream corresponding to at least some converted portions of the analog video signals;
   b. a video decoder coupled to the data stream processor configured to decode digital video signals received from the data stream processor in order to provide a second digital video data stream;

c. a graphical image detector coupled to the data stream processor and to the video decoder and configured to receive a the first digital video data stream from the data stream processor or the second digital video data stream from the video decoder, and to automatically and autonomously detect, in the first digital video data stream or second digital video data stream, scannable icon data corresponding to a scannable icon, the scannable icon data configured for generation of a scannable icon for presentation on a video display, the scannable icon including at least one built-in recognition-aid precursor, the scannable icon capable of being scanned from the video display by a mobile device to produce at least an address configured to allow the mobile device automatically to access content on the internet; the graphical image detector configured to detect the scannable icon data by comparing pixels in a bitmap in recognition-aid precursor data in the scannable icon data, the recognition-aid precursor data corresponding to the at least one built-in recognition-aid precursor in scannable icon;

d. a graphical image decoder configured to receive information scannable icon data from the graphical image detector and to decode the scannable icon data to produce decoded data that includes at least (1) an address configured to allow access to content on the internet; and (2) collateral information that includes at least one of channel source, unique identifier and timestamp;

f. a first library configured to receive, from the graphical image decoder, the decoded data and to store the decoded data, the first library also configured to receive ancillary information, the ancillary information relevant to the analog or digital video signal that includes the scannable icon data; and g. a second library configured to receive at least some of the information in the first library and control instructions, and to output information relating to the scannable icon data and the ancillary information relevant to the analog or digital video data signal that includes the scannable icon data, to at least one media insertion functionality.

19. A system according to claim 18 wherein the second library is configured to output information relating to first scannable image data and ancillary information relevant to the first scannable image data, to a first media insertion functionality, and to output information relating to second scannable image data and ancillary information relevant to the second scannable image data, to a second media insertion functionality.

20. A method for managing information relating to scannable icon data, the scannable icon data included in an analog video signal or digital video signal, the scannable icon data generated by a source provider, the method comprising:

a. in a data stream processor, receiving from the source provider and processing one or more analog video signals or digital video signals and in the case of analog video signals, converting portions of the analog video signals to digital format and providing a first digital video data stream corresponding to at least some converted portions of the analog video signals;

b. in a video decoder coupled to the data stream processor, decoding at least one of the digital video signals received from the data stream processor and providing a second digital video data stream;

c. in a graphical image detector coupled to the data stream processor and to the video decoder, receiving the first digital video data stream from the data stream processor or the second digital video data stream from the video decoder, and automatically and autonomously detecting, in the first digital video data stream or second digital video data stream, scannable icon data corresponding to a scannable icon, the scannable icon data configured for generation of a scannable icon for presentation on a video display, the scannable icon including at least one built-in recognition-aid precursor, the scannable icon capable of being scanned from the video display by a mobile device to produce at least an address configured to allow the mobile device automatically to access content on the internet; wherein the detecting is accomplished by comparing pixels in a bitmap in recognition-aid precursor data in the scannable icon data, the recognition-aid precursor data corresponding to the at least one built-in recognition-aid precursor in scannable icon;

d. in a graphical image decoder, receiving scannable icon data from the graphical image detector and decoding the scannable icon data to produce decoded data that includes at least (1) an address configured to allow access to content on the internet; and (2) collateral information that includes at least one of channel source, unique identifier and timestamp; and e. in a first library, receiving from the graphical image decoder the decoded data and storing the decoded data, and receiving ancillary information, the ancillary information relevant to the analog or digital video signal that includes the scannable icon data.

21. A method according to claim 20, wherein the method is practiced by a user.

22. A method according to claim 20, wherein the method is practiced by a video provider.

* * * * *